(12) United States Patent
Yonezawa et al.

(10) Patent No.: US 10,620,399 B2
(45) Date of Patent: Apr. 14, 2020

(54) ZOOM LENS AND IMAGING APPARATUS

(71) Applicant: FUJIFILM Corporation, Tokyo (JP)

(72) Inventors: Masaru Yonezawa, Saitama (JP); Shinkichi Ikeda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 16/014,064

(22) Filed: Jun. 21, 2018

(65) Prior Publication Data

US 2018/0299643 A1 Oct. 18, 2018

Related U.S. Application Data

(63) Continuation of application No. PCT/JP2016/081150, filed on Oct. 20, 2016.

(30) Foreign Application Priority Data

Jan. 27, 2016 (JP) ................... 2016-013137

(51) Int. Cl.
*G02B 15/14* (2006.01)
*G02B 7/10* (2006.01)
(Continued)

(52) U.S. Cl.
CPC ............. *G02B 7/10* (2013.01); *G02B 13/18* (2013.01); *G02B 15/167* (2013.01); *G02B 15/20* (2013.01);
(Continued)

(58) Field of Classification Search
CPC ...... G02B 13/009; G02B 15/20; G02B 15/14; G02B 15/16; G02B 13/18; G02B 15/167;
(Continued)

(56) References Cited

U.S. PATENT DOCUMENTS

2009/0296231 A1   12/2009   Shirasuna
2012/0062993 A1   3/2012   Li
(Continued)

FOREIGN PATENT DOCUMENTS

JP   2009-086537 A   4/2009
JP   2009-288619 A   12/2009
(Continued)

OTHER PUBLICATIONS

International Search Report issued in PCT/JP2016/081150; dated Jan. 17, 2017.
(Continued)

*Primary Examiner* — Evelyn A Lester
(74) *Attorney, Agent, or Firm* — Studebaker & Brackett PC

(57) ABSTRACT

Provided are a zoom lens which can be configured to have a small size while ensuring a high zoom ratio and has high optical performance by satisfactorily correcting chromatic aberration, and an imaging apparatus including the zoom lens. The zoom lens consists of, in order from the object side, a first lens group G1 that has a positive refractive power and remains stationary during zooming, a plurality of movable lens groups that move during zooming; and a final lens group Ge that has a positive refractive power and remains stationary during zooming. At least one movable lens group has a negative refractive power. The movable lens group, which is closest to the object side and has a negative refractive power, has two or more negative lenses, and satisfies predetermined conditional expressions.

20 Claims, 20 Drawing Sheets

EXAMPLE 1

(51) Int. Cl.
*G02B 15/167* (2006.01)
*G02B 13/18* (2006.01)
*G02B 15/20* (2006.01)
G02B 13/00 (2006.01)
G02B 15/16 (2006.01)
G02B 5/00 (2006.01)
G02B 9/34 (2006.01)
G02B 9/62 (2006.01)

(52) U.S. Cl.
CPC ............ *G02B 5/005* (2013.01); *G02B 9/34* (2013.01); *G02B 9/62* (2013.01); *G02B 13/002* (2013.01); *G02B 13/009* (2013.01); *G02B 15/14* (2013.01); *G02B 15/16* (2013.01)

(58) Field of Classification Search
CPC . G02B 5/005; G02B 9/34; G02B 9/62; G02B 7/10; G02B 13/002
USPC ....... 359/676, 683–686, 688, 714, 715, 740, 359/755–760, 763–768, 771–773, 775
See application file for complete search history.

(56) References Cited

U.S. PATENT DOCUMENTS

| 2013/0271643 A1 | 10/2013 | Inomoto |
| 2013/0271849 A1 | 10/2013 | Hori |
| 2014/0198394 A1 | 7/2014 | Komatsu et al. |
| 2014/0240849 A1 | 8/2014 | Toyama et al. |
| 2015/0241673 A1 | 8/2015 | Nagatoshi |
| 2015/0316756 A1 | 11/2015 | Sanjo |
| 2015/0362711 A1* | 12/2015 | Wakazono ............. G02B 15/16 359/684 |

FOREIGN PATENT DOCUMENTS

| JP | 2012-058620 A | 3/2012 |
| JP | 2013-109013 A | 6/2013 |
| JP | 2013-221976 A | 10/2013 |
| JP | 2013-221999 A | 10/2013 |
| JP | 2014-235203 A | 12/2014 |
| JP | 2015-004917 A | 1/2015 |
| JP | 2015-034903 A | 2/2015 |
| JP | 2015-094866 A | 5/2015 |
| JP | 2015-161695 A | 9/2015 |
| JP | 5777225 B2 | 9/2015 |
| JP | 2015-176129 A | 10/2015 |
| JP | 2015-212724 A | 11/2015 |
| JP | 2015-212725 A | 11/2015 |
| JP | 2015-230449 A | 12/2015 |
| JP | 2016-004076 A | 1/2016 |
| JP | 2016-080716 A | 5/2016 |
| JP | 2016-080717 A | 5/2016 |
| JP | 2016-126278 A | 7/2016 |
| WO | 2013/065288 A1 | 5/2013 |

OTHER PUBLICATIONS

International Preliminary Report on Patentability and Written Opinion issued in PCT/JP2016/081150; dated Jul. 31, 2018.

* cited by examiner

EXAMPLE 2

EXAMPLE 3

EXAMPLE 4

EXAMPLE 5

EXAMPLE 6

EXAMPLE 7

EXAMPLE 8

EXAMPLE 9

FIG. 11
EXAMPLE 1
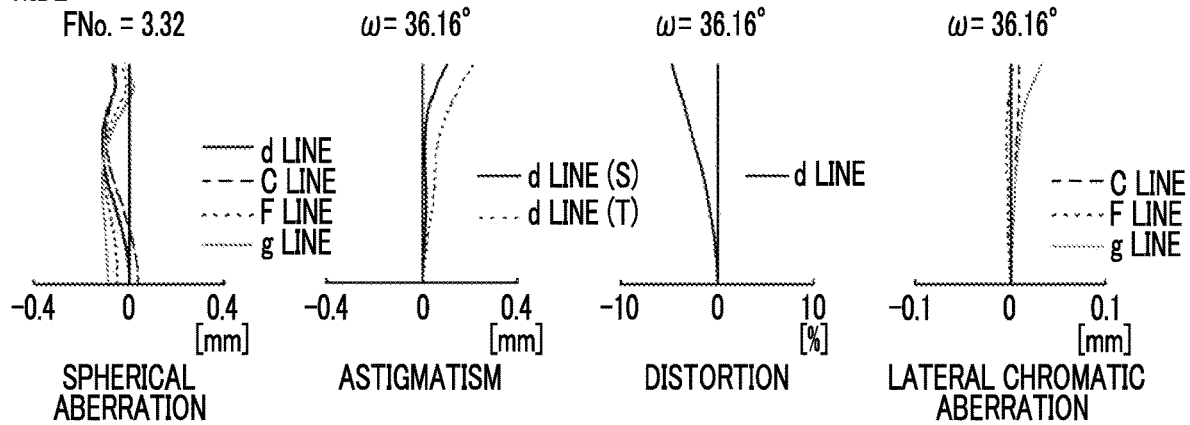
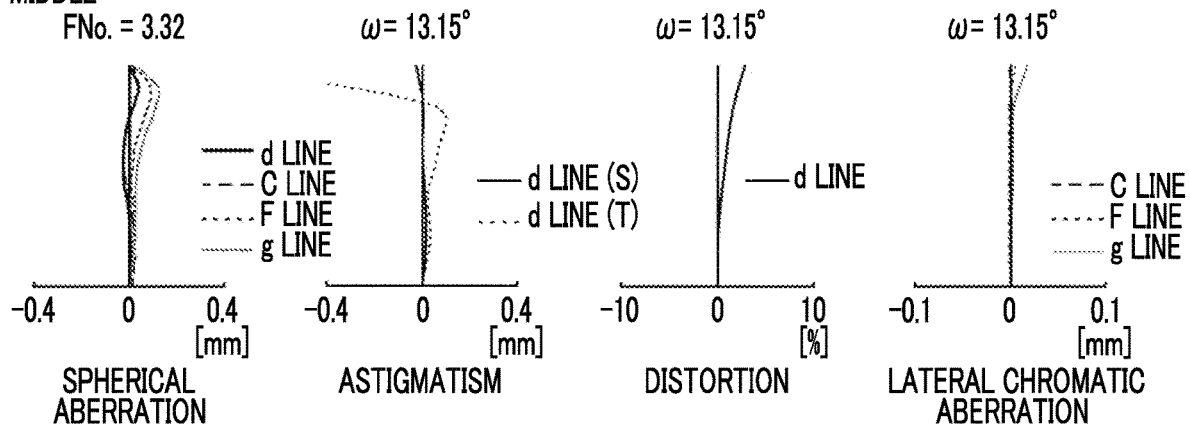
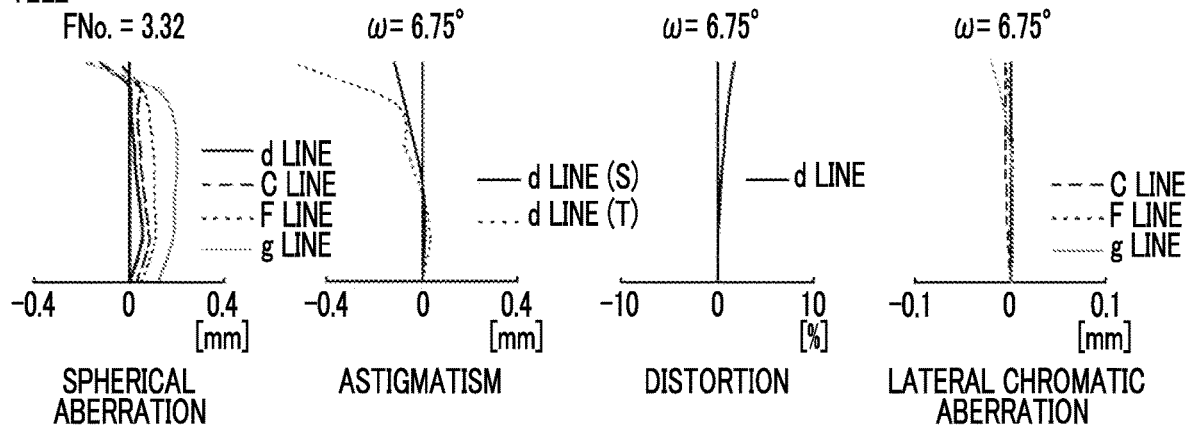

FIG. 12
EXAMPLE 2
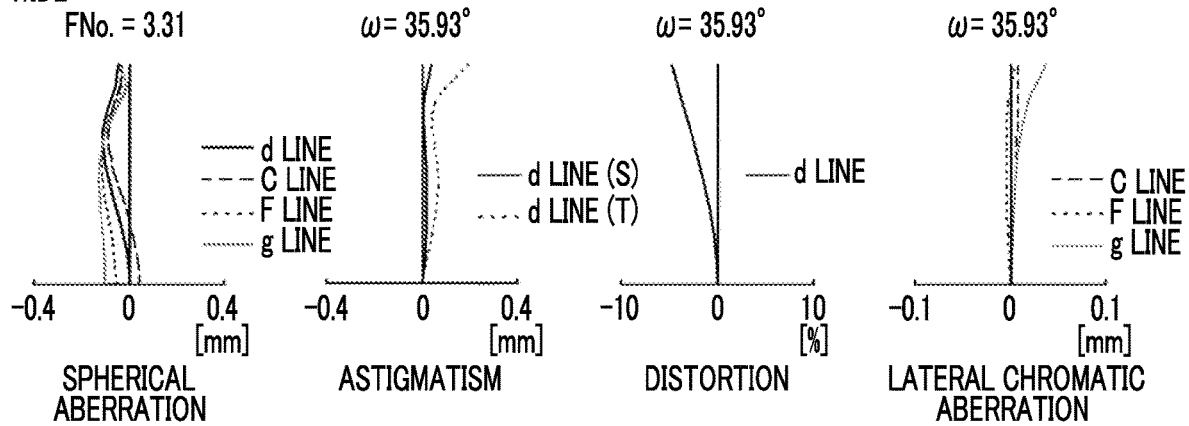
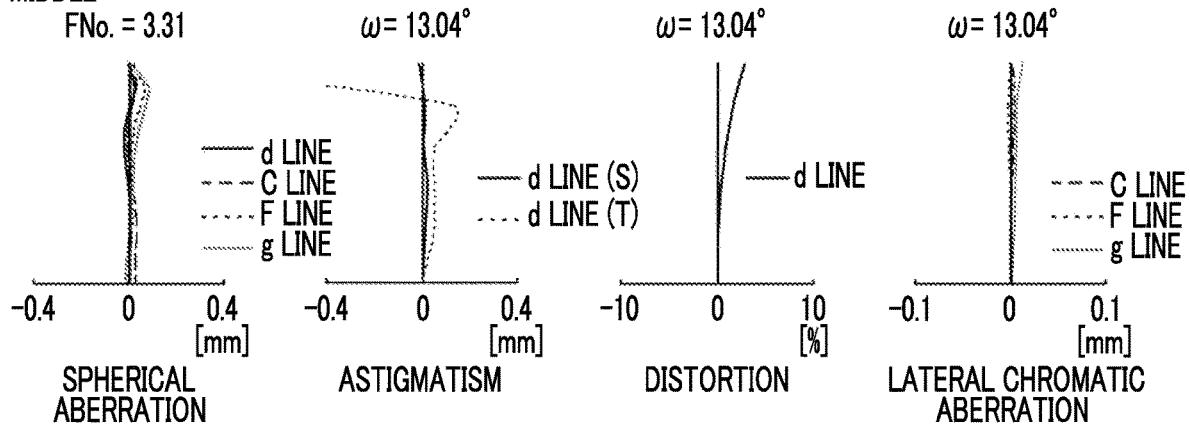
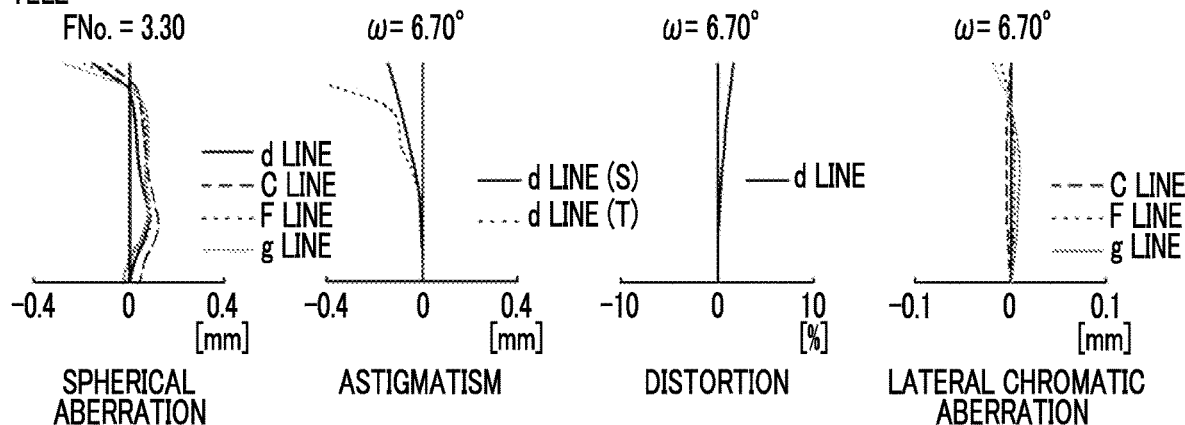

FIG. 13
EXAMPLE 3
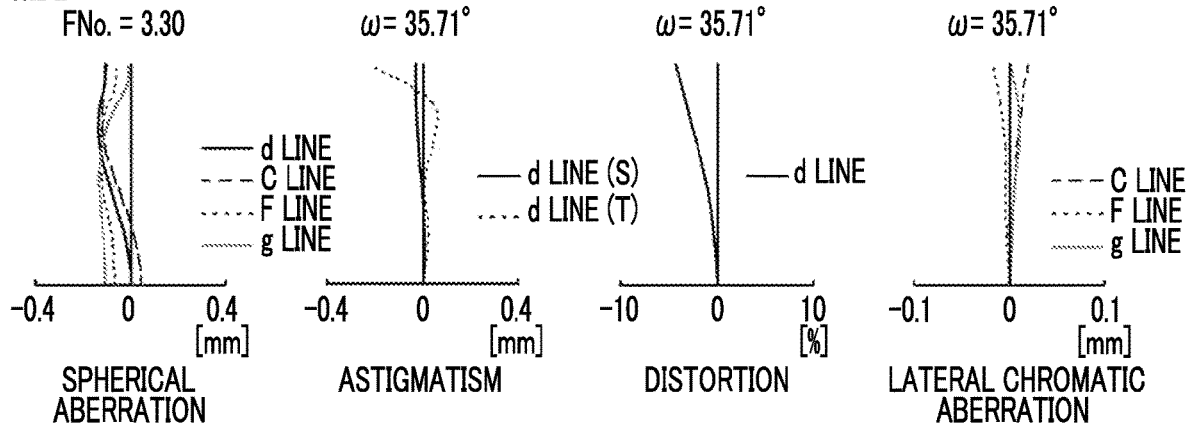
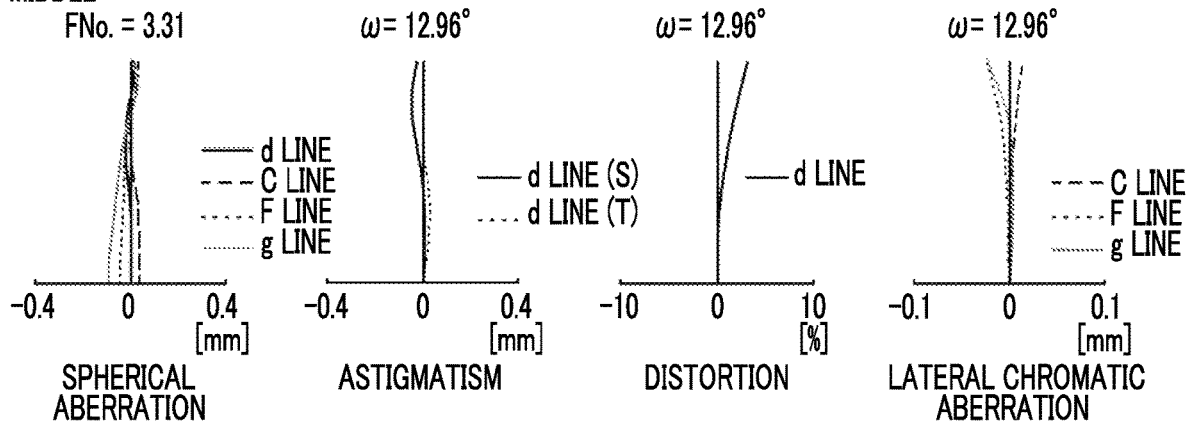
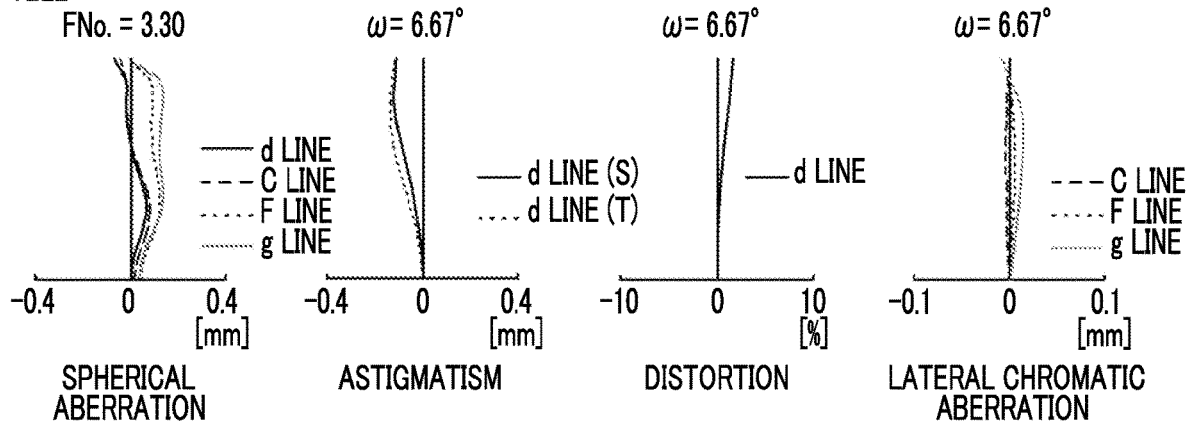

FIG. 14
EXAMPLE 4
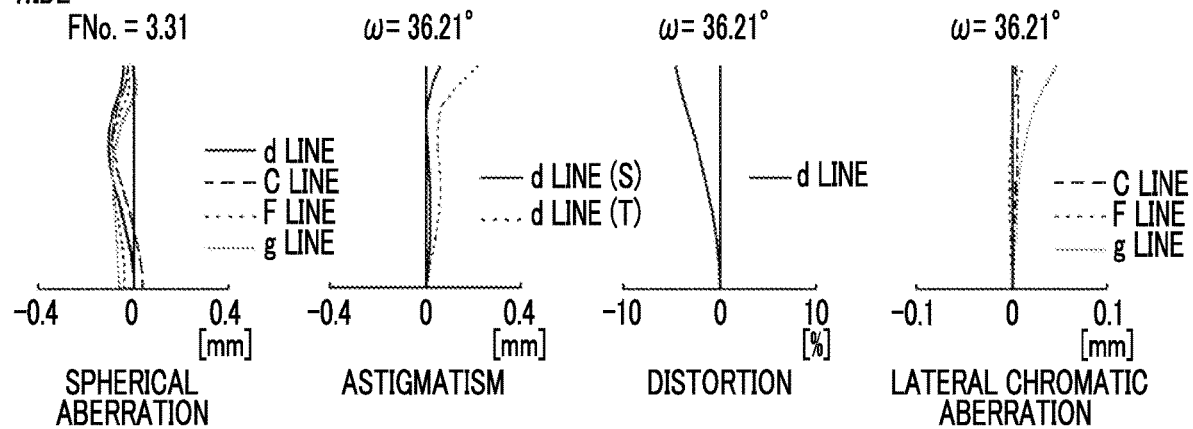
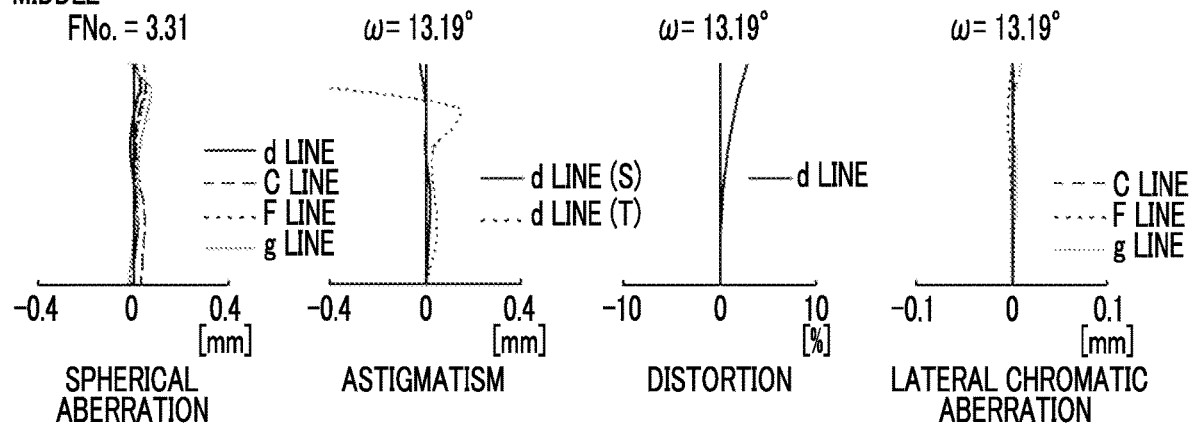
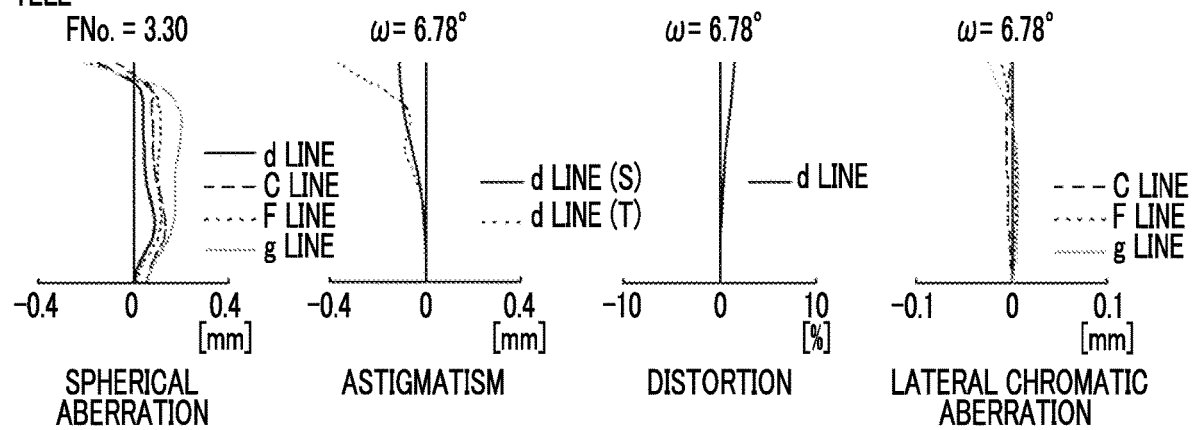

FIG. 16
EXAMPLE 6
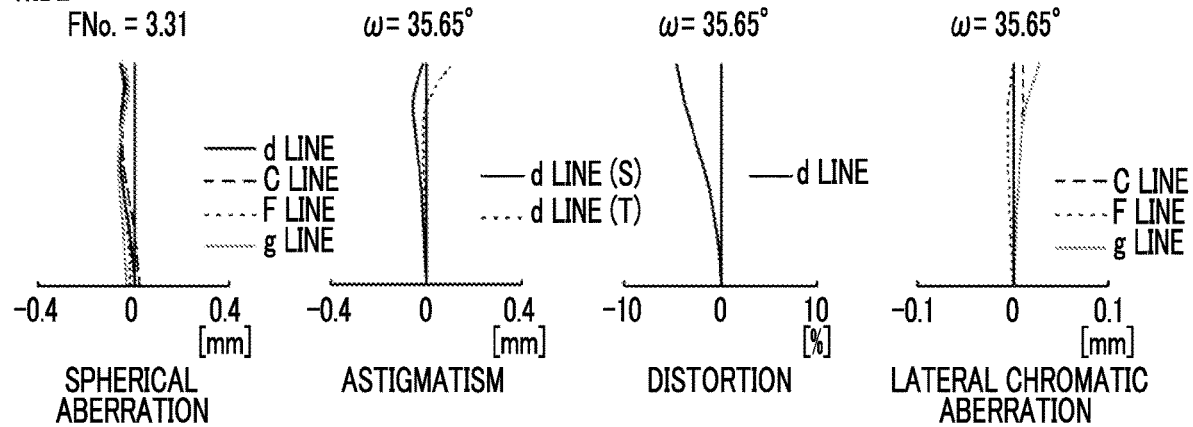
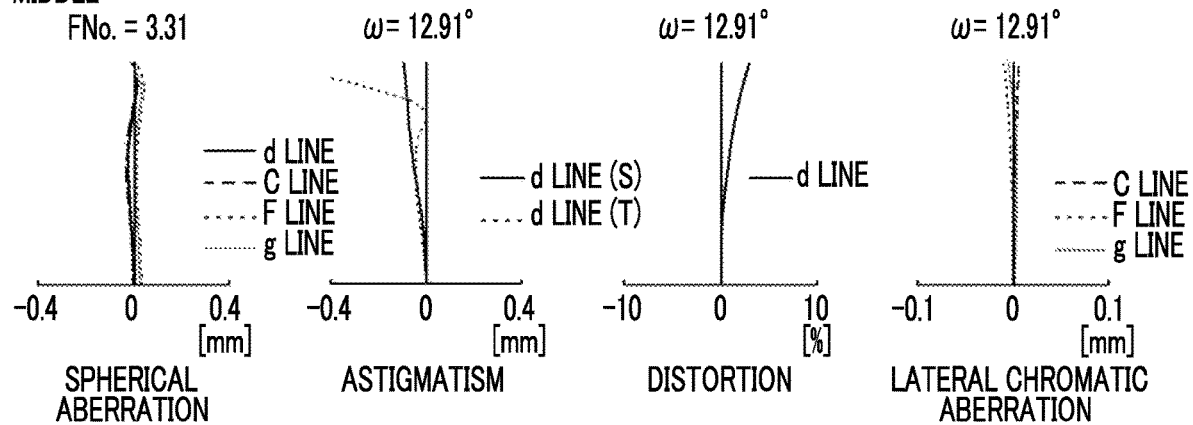
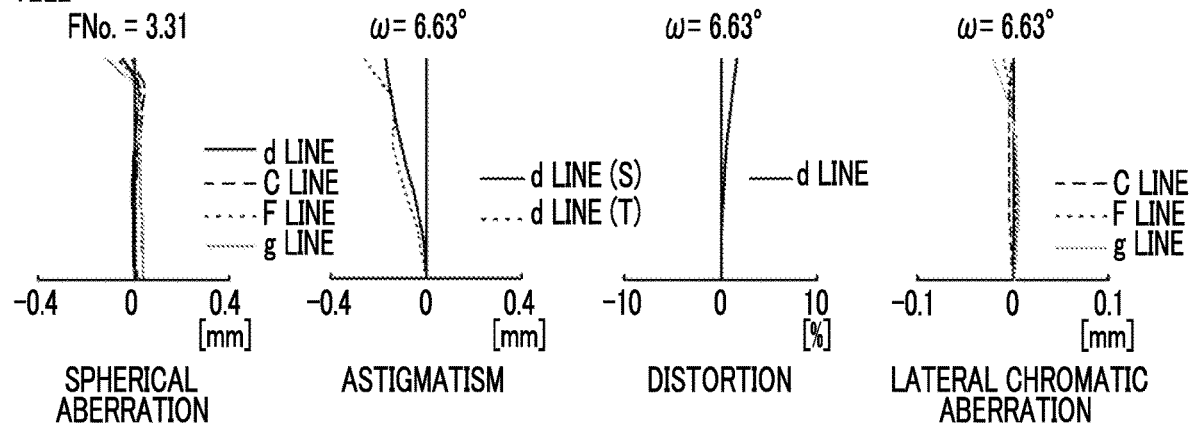

FIG. 17
EXAMPLE 7
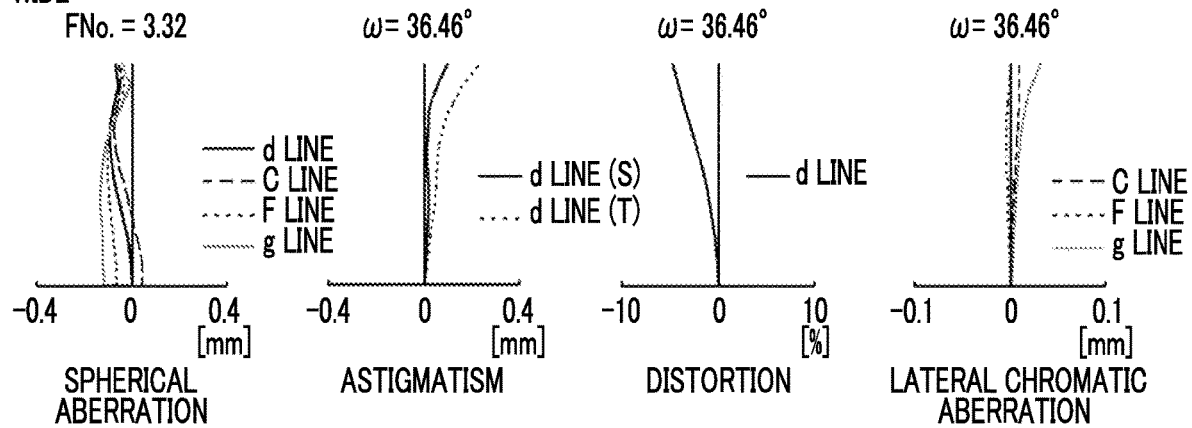
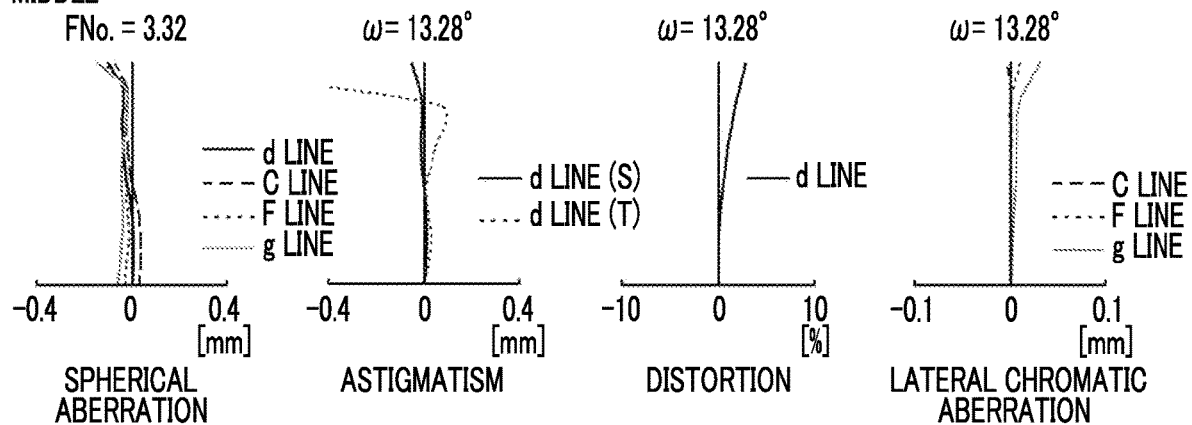
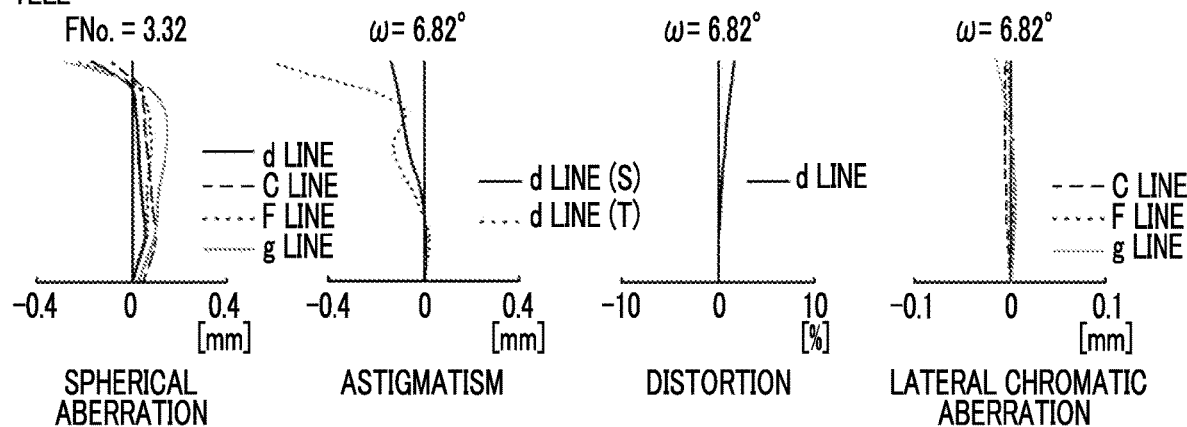

FIG. 19
EXAMPLE 9
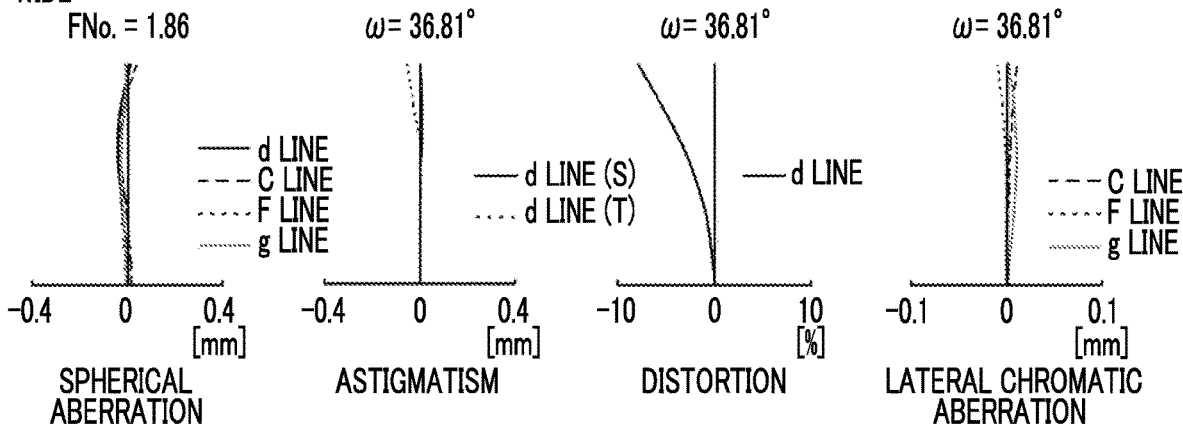
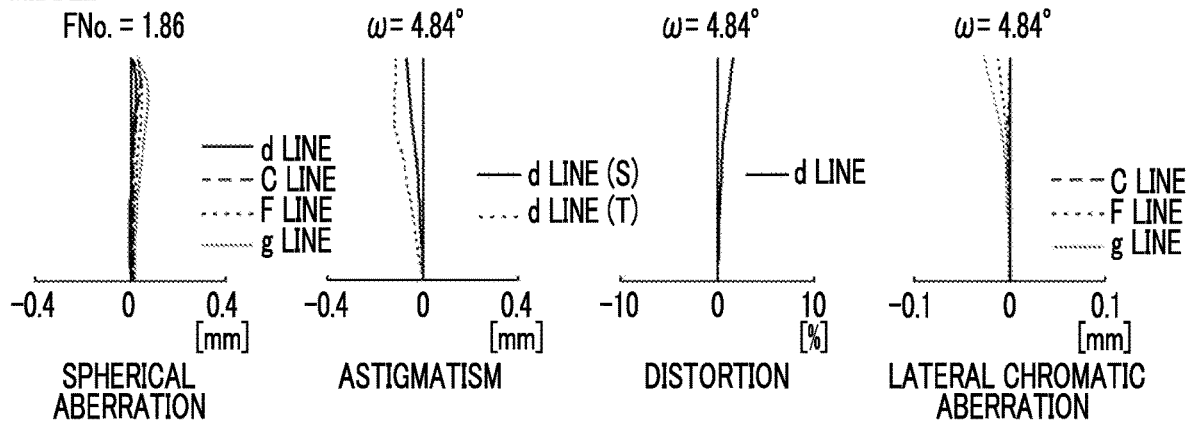
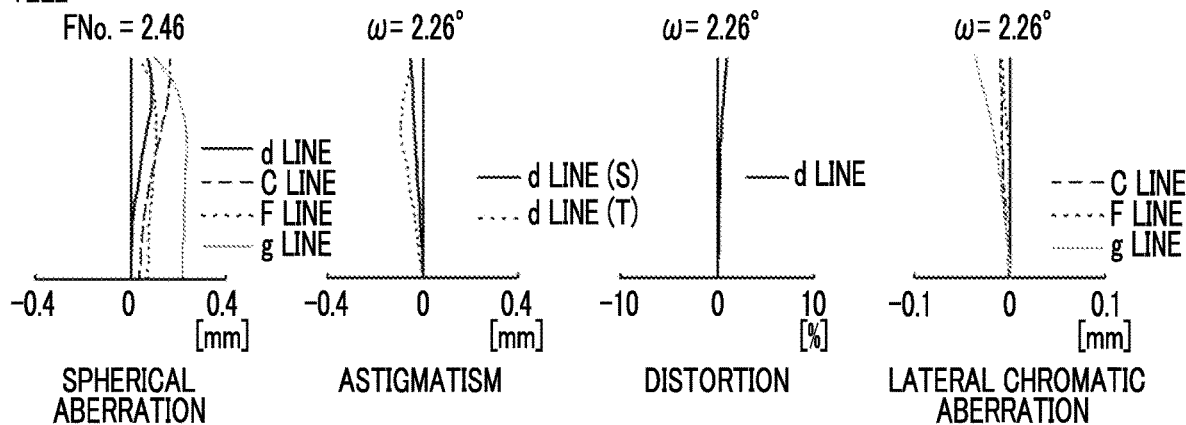

ZOOM LENS AND IMAGING APPARATUS

CROSS-REFERENCE TO RELATED APPLICATIONS

This application is a Continuation of PCT International Application No. PCT/JP2016/081150 filed on Oct. 20, 2016, which claims priority under 35 U.S.C. § 119(a) to Japanese Patent Application No. 2016-013137 filed on Jan. 27, 2016. Each of the above application(s) is hereby expressly incorporated by reference, in its entirety, into the present application.

BACKGROUND OF THE INVENTION

1. Field of the Invention

The present invention relates to a zoom lens suitable for movie imaging cameras, broadcast cameras, digital cameras, video cameras, and surveillance cameras, and to an imaging apparatus comprising the zoom lens.

2. Description of the Related Art

In the related art, a zoom lens having a four-group configuration or a five-group configuration has been proposed as a lens system that can be used for cameras in the above-mentioned fields. For example, JP2015-94866A describes a zoom lens having a four-group configuration and a zoom lens having a five-group configuration. The zoom lens having the four-group configuration is a lens system consisting of, in order from the object side: a first lens group that has a positive refractive power and remains stationary during zooming; a second lens group that has a negative refractive power and moves during zooming; a third lens group that has a negative refractive power and moves during zooming; and a fourth lens group that has a positive refractive power and remains stationary during zooming. The zoom lens having the five-group configuration is a lens system consisting of, in order from the object side: a first lens group that has a positive refractive power and remains stationary during zooming; a second lens group that has a negative refractive power and moves during zooming; a third lens group that has a negative refractive power and moves during zooming; a fourth lens group that has a negative refractive power and moves during zooming; and a five lens group that has a positive refractive power and remains stationary during zooming. In addition, JP5777225B describes a zoom lens having a four-group configuration. The zoom lens consists of, in order from the object side, a first lens group that has a positive refractive power and remains stationary during zooming; a second lens group that has a negative refractive power and moves during zooming; a third lens group that has a negative refractive power and moves during zooming; and a fourth lens group that has a positive refractive power and remains stationary during zooming.

SUMMARY OF THE INVENTION

Meanwhile, in cameras in the above-mentioned field, it is desired that a higher-resolution image can be acquired with a higher zoom ratio. In order to obtain a high-resolution image, it is necessary to satisfactorily correct chromatic aberration of the lens system to be mounted. However, in a case where the configuration is intended to be applied, the number of lenses tends to be large. This leads to an increase in size of the lens system. There is a demand for a lens system which can be configured to have a small size by minimizing the number of lenses and in which a high zoom ratio and high performance are achieved.

However, in the lens system described in JP2015-94866A, the number of lenses of the first lens group is large and reduction in size is not achieved, or the zoom ratio is insufficient. It is desired that the lens system described in JP5777225B has a higher zoom ratio in order to meet the recent demands.

The present invention has been made in consideration of the above-mentioned situations, and its object is to provide a zoom lens which can be configured to have a small size while ensuring a high zoom ratio and has high optical performance by satisfactorily correcting chromatic aberration, and an imaging apparatus comprising the zoom lens.

A zoom lens of the present invention comprises, in order from an object side: a first lens group that has a positive refractive power and remains stationary with respect to an image plane during zooming; a plurality of movable lens groups that move by changing distances between groups adjacent to each other in a direction of an optical axis during zooming; and a final lens group that has a positive refractive power and remains stationary with respect to the image plane during zooming. In the plurality of movable lens groups, at least one movable lens group has a negative refractive power. In a case where the movable lens group which is closest to the object side and has a negative refractive power is set as a front side negative lens group, the front side negative lens group has two or more negative lenses. In addition, all Conditional Expressions (1) to (3) are satisfied.

$$2.395 < NF2 + 0.012 \times vF2 < 2.495 \quad (1)$$

$$-35 < vF1 - vF2 < -16 \quad (2)$$

$$0.12 < NF1 - NF2 < 0.34 \quad (3)$$

Here, NF2 is a refractive index of a second negative lens from the object side in the front side negative lens group at the d line, vF2 is an Abbe number of the second negative lens from the object side in the front side negative lens group at the d line, vF1 is an Abbe number of a negative lens closest to the object side in the front side negative lens group at the d line, and NF1 is a refractive index of the negative lens closest to the object side in the front side negative lens group at the d line.

In the zoom lens of the present invention, it is preferable that at least one of Conditional Expression (4), (1-1), (2-1), (3-1), or (4-1) is satisfied.

$$0.93 < fF2/fGNF < 1.1 \quad (4)$$

$$2.395 < NF2 + 0.012 \times vF2 < 2.455 \quad (1-1)$$

$$-33 < vF1 - vF2 < -18 \quad (2-1)$$

$$0.13 < NF1 - NF2 < 0.31 \quad (3-1)$$

$$0.94 < fF2/fGNF < 1.05 \quad (4-1)$$

Here, fF2 is a focal length of the second negative lens from the object side in the front side negative lens group, fGNF is a focal length of the front side negative lens group, NF2 is a refractive index of a second negative lens from the object side in the front side negative lens group at the d line, vF2 is an Abbe number of the second negative lens from the object side in the front side negative lens group at the d line, vF1 is an Abbe number of a negative lens closest to the object side in the front side negative lens group at the d line, and NF1 is a refractive index of the negative lens closest to the object side in the front side negative lens group at the d line.

In the zoom lens of the present invention, in the plurality of movable lens groups, at least two movable lens groups all have a negative refractive power. In a case where the movable lens group which is closest to an image side and has a negative refractive power is set as a rear side negative lens group, it is preferable that the rear side negative lens group includes a negative lens and a positive lens, and Conditional Expressions (5) and (6) are satisfied. In this case, it is more preferable that Conditional Expressions (5) and (6) are satisfied and then Conditional Expressions (5-1) and/or (6-1) are satisfied.

$$2.395 < NRn + 0.012 \times vRn < 2.495 \quad (5)$$

$$25 < vRn - vRp < 35 \quad (6)$$

$$2.395 < NRn + 0.012 \times vRn2 < 2.455 \quad (5\text{-}1)$$

$$27 < vRn - vRp < 30 \quad (6\text{-}1)$$

Here, NRn is a refractive index of the negative lens of the rear side negative lens group at the d line, vRn is an Abbe number of the negative lens of the rear side negative lens group at the d line, and vRp is an Abbe number of the positive lens of the rear side negative lens group at the d line.

In a case where the rear side negative lens group includes the negative lens and the positive lens, it is more preferable that Conditional Expression (7) is satisfied, and it is more preferable that Conditional Expression (7-1) is satisfied.

$$0.35 < fRn/fGNR < 0.51 \quad (7)$$

$$0.37 < fRn/fGNR < 0.48 \quad (7\text{-}1)$$

Here, fRn is a focal length of the negative lens of the rear side negative lens group, and fGNR is a focal length of the rear side negative lens group.

In the zoom lens of the present invention, the plurality of movable lens groups may be configured to include a lens group having a negative refractive power and a lens group having a negative refractive power. Alternatively, the plurality of movable lens groups may be configured to include, in order from the object side, a lens group having a positive refractive power, a lens group having a negative refractive power, and a lens group having a negative refractive power. Alternatively, the plurality of movable lens groups may be configured to include, in order from the object side, a lens group having a negative refractive power, a lens group having a positive refractive power, and a lens group having a negative refractive power.

An imaging apparatus of the present invention comprises the zoom lens of the present invention.

In the present specification, it should be noted that the term "substantially consisting of ~" and "substantially consists of ~" means that the imaging lens may include not only the above-mentioned elements but also lenses substantially having no powers, optical elements, which are not lenses, such as a stop, and/or a cover glass, and mechanism parts such as a lens flange, a lens barrel, and/or a camera shaking correction mechanism.

It should be noted that the "lens group" is not necessarily composed of a plurality of lenses, but may be composed of only one lens. The above "~ lens group having a positive refractive power" and "~ lens group having a negative refractive power" each represent the sign of the refractive power of the corresponding lens group as a whole. Signs of refractive powers of the lens groups and signs of refractive powers of the lenses are assumed as those in paraxial regions in a case where some lenses have aspheric surfaces. All the conditional expressions relate to the d line (a wavelength of 587.6 nm, nm: nanometer) unless otherwise noted.

It should be noted that the partial dispersion ratio θgF between the g line and the F line of a certain lens is defined by θgF=(Ng−NF)/(NF−NC), where Ng, NF, and NC are the refractive indices of the lens at the g line, the F line, and the C line.

According to the present invention, the zoom lens consists of, in order from the object side, the first lens group that has a positive refractive power and remains stationary during zooming, the plurality of movable lens groups that move during zooming, and the final lens group that has a positive refractive power and remains stationary during zooming. In the zoom lens, one or more movable lens groups are set as negative lens groups, and the configuration of the movable lens groups having a negative refractive powers is set, such that the predetermined conditional expressions are satisfied. With such a configuration, it is possible to provide a zoom lens, which can be configured to have a small size while ensuring a high zoom ratio and has high optical performance by satisfactorily correcting chromatic aberration, and an imaging apparatus comprising the zoom lens.

BRIEF DESCRIPTION OF THE DRAWINGS

FIG. 11 is a diagram of aberrations of the zoom lens according to Example 1 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 12 is a diagram of aberrations of the zoom lens according to Example 2 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 13 is a diagram of aberrations of the zoom lens according to Example 3 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 14 is a diagram of aberrations of the zoom lens according to Example 4 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 16 is a diagram of aberrations of the zoom lens according to Example 6 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 17 is a diagram of aberrations of the zoom lens according to Example 7 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

FIG. 19 is a diagram of aberrations of the zoom lens according to Example 9 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

DESCRIPTION OF THE PREFERRED EMBODIMENTS

Figure 1:
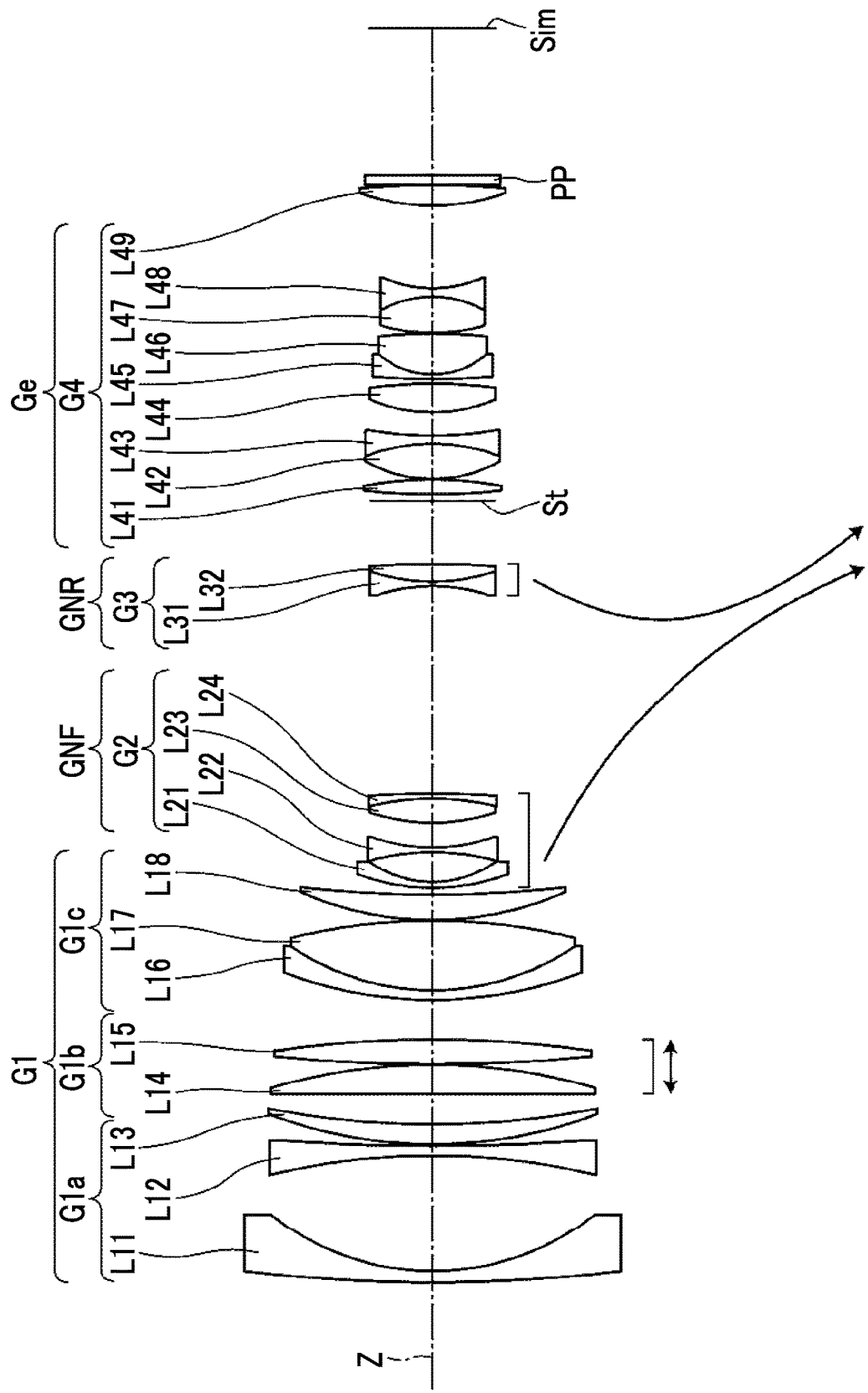
FIG. 1 is a cross-sectional view illustrating a configuration of a zoom lens of Example 1 of the present invention.
Figure 2:
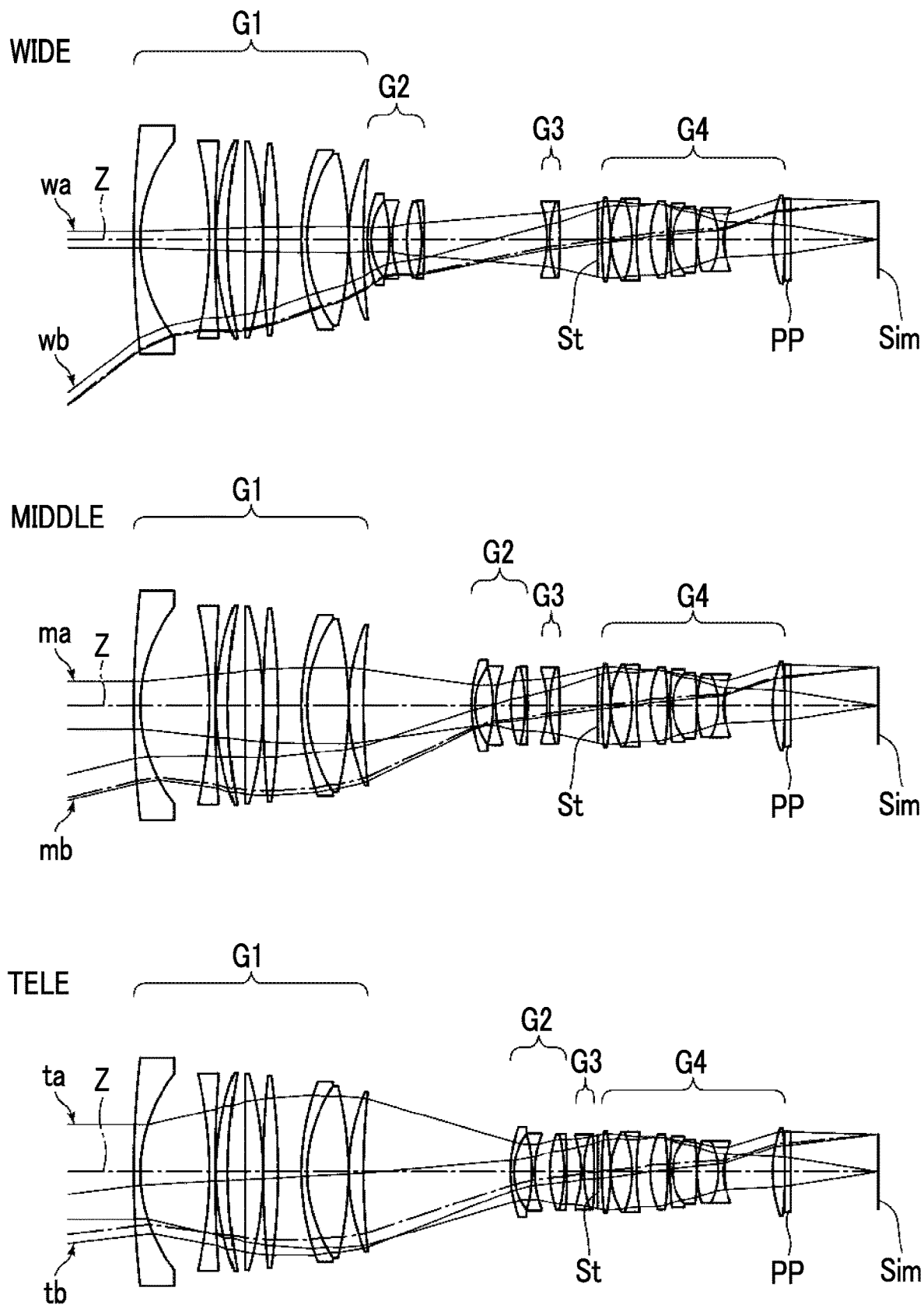
FIG. 2 is a cross-sectional view illustrating rays and the configuration of the zoom lens shown in FIG. 1, where the upper part thereof shows the zoom lens in the wide-angle end state, the middle part thereof shows the zoom lens in the middle focal length state, and the lower part thereof shows the zoom lens in the telephoto end state.

Hereinafter, embodiments of the present invention will be described with reference to drawings. FIG. 1 is a cross-sectional view illustrating a lens configuration of a zoom lens at the wide-angle end according to an embodiment of the present invention. FIG. 2 shows the lens configurations of the zoom lens shown in FIG. 1 and rays of each configuration. In FIG. 2, the wide-angle end state is shown in the upper part indicated by "WIDE", and rays are shown as on-axis rays wa and rays with the maximum angle of view wb. Further, the middle focal length state is shown in the middle part indicated by "MIDDLE", and rays are shown as on-axis rays ma and rays with the maximum angle of view mb. In addition, the telephoto end state are shown in the lower part indicated by "TELE", and rays are shown as on-axis rays to and rays with the maximum angle of view tb. The examples shown in FIGS. 1 and 2 correspond to the zoom lens of Example 1 to be described later. FIGS. 1 and 2 each show a state where the object at infinity is in focus, where the left side of the drawing is the object side and the right side of the drawing is the image side. Hereinafter, description will be given mainly with reference to FIG. 1.

In order to mount the zoom lens on an imaging apparatus, it is preferable to provide various filters and/or a protective cover glass based on specification of the imaging apparatus. Thus, FIG. 1 shows an example where an optical member PP, in which those are considered and of which the incident surface and the exit surface are parallel, is disposed between the lens system and the image plane Sim. However, a position of the optical member PP is not limited to that shown in FIG. 1, and it is also possible to adopt a configuration in which the optical member PP is omitted.

The zoom lens of the present embodiment substantially consists of, in order from the object side along the optical axis Z: a first lens group G1 that remains stationary with respect to an image plane Sim during zooming and has a positive refractive power; a plurality of movable lens groups that move by changing distances between groups adjacent to each other in a direction of an optical axis during zooming; and a final lens group Ge that has positive refractive power and remains stationary with respect to the image plane Sim during zooming.

In the plurality of movable lens groups, at least one movable lens group is configured to have a negative refractive power. Further, in the plurality of movable lens groups, it is preferable that at least two movable lens groups all are configured to have a negative refractive power. The zoom lens of the example shown in FIG. 1 is an example in which two movable lens groups have negative refractive powers. Hereinafter, among the plurality of movable lens groups arranged between the first lens group G1 and the final lens group Ge, the movable lens group, which has a negative refractive power and is closest to the object side, is referred to as a front side negative lens group GNF, and the movable lens group, which has a negative refractive power and is closest to the image side, is referred to as the rear side negative lens group GNR.

The zoom lens of the example shown in FIG. 1 substantially consists of, in order from the object side along the optical axis Z, a first lens group G1 having a positive refractive power, a second lens group G2 having a negative refractive power, a third lens group G3 having a negative refractive power, and a fourth lens group G4 having a positive refractive power. During zooming, the first lens group G1 and the fourth lens group G4 remain stationary with respect to the image plane Sim, and the second lens group G2 and the third lens group G3 move by changing a relative distance therebetween in the direction of the optical axis. In the example shown in FIG. 1, the second lens group G2 and the third lens group G3 each are a movable lens group, the second lens group G2 corresponds to the front side negative lens group GNF, the third lens group G3 corresponds to the rear side negative lens group GNR, and the fourth lens group G4 corresponds to the final lens group Ge. In FIG. 1, under each of the second lens group G2 and the third lens group G3, a direction of moving each lens group during zooming from the wide-angle end to the telephoto end is schematically indicated by an arrow.

In the example shown in FIG. 1, the first lens group G1 consists of a total of eight lenses including a first negative lens L11, a second negative lens L12, and lenses L13 to L18 in order from the object side. The second lens group G2 consists of four lenses including lenses L21 to L24 in order from the object side. The third lens group G3 consists of two lenses including lenses L31 and L32 in order from the object side. The fourth lens group G4 consists of nine lenses including lenses L41 to L49 in order from the object side. However, in the zoom lens of the present invention, the number of lenses composing each lens group is not necessarily limited to the example shown in FIG. 1.

FIG. 1 shows an example in which an aperture stop St is disposed between the third lens group G3 and the fourth lens group G4, but the aperture stop St may be disposed at another position. Further, the aperture stop St shown in FIG. 1 does not necessarily indicate its sizes and/or shapes, and indicates a position of the aperture stop St on the optical axis Z.

In the zoom lens of the present embodiment, by forming the first lens group G1 closest to the object side as a positive lens group, it is possible to shorten the total length of the lens system, and thus there is an advantage in reduction in size. By forming the final lens group Ge closest to the image side as the positive lens group, it is possible to suppress an increase in incident angle of the principal ray of the off-axis rays incident onto the image plane Sim. As a result, it is possible to suppress shading. In addition, by adopting a configuration in which the lens group closest to the object side and the lens group closest to the image side remain stationary during zooming, it is possible to make the total length of the lens system unchanged during zooming.

In the plurality of movable lens group, at least one movable lens group has a negative refractive power. Thus, it is possible to contribute to realization of a high zoom ratio.

The front side negative lens group GNF is configured to have two or more negative lenses and to satisfy Conditional Expressions (1) to (3).

$$2.395 < NF2 + 0.012 \times vF2 < 2.495 \quad (1)$$

$$-35 < vF1 - vF2 < -16 \quad (2)$$

$$0.12 < NF1 - NF2 < 0.34 \quad (3)$$

Here, NF2 is a refractive index of a second negative lens from the object side in the front side negative lens group at the d line, vF2 is an Abbe number of the second negative lens from the object side in the front side negative lens group at the d line, vF1 is an Abbe number of a negative lens closest to the object side in the front side negative lens group at the d line, and NF1 is a refractive index of the negative lens closest to the object side in the front side negative lens group at the d line.

By not allowing the result of Conditional Expression (1) to be equal to or less than the lower limit, it is possible to prevent the power of the lens necessary for achromatizing lateral chromatic aberration on the wide-angle side from becoming too strong. Thereby, it is possible to suppress change in spherical aberration caused by zooming. By not allowing the result of Conditional Expression (1) to be equal to or greater than the upper limit, it is possible to prevent the power of the lens necessary for lateral chromatic aberration on the wide-angle side from becoming too weak, and it is possible to minimize an amount of movement of the movable lens group during zooming. Thus, it becomes easy to realize a high zoom ratio while achieving reduction in size. Further, it is preferable to satisfy Conditional Expression (1-1). By not allowing the result of Conditional Expression (1-1) to be equal to or greater than the upper limit, it is possible to further increase an effect relating to an upper limit of Conditional Expression (1).

$$2.395 < NF2 + 0.012 \times vF2 < 2.455 \quad (1-1)$$

By not allowing the result of Conditional Expression (2) to be equal to or less than the lower limit, it is possible to prevent lateral chromatic aberration on the wide-angle side from being insufficiently corrected, and to prevent longitudinal chromatic aberration on the telephoto side from being insufficiently corrected. As a result, there is an advantage in obtaining favorable optical performance. By not allowing the result of Conditional Expression (2) to be equal to or greater than the upper limit, it is possible to prevent lateral chromatic aberration on the wide-angle side from being excessively corrected, and to prevent longitudinal chromatic aberration on the telephoto side from being excessively corrected. As a result, there is an advantage in obtaining favorable optical performance. In order to more enhance the effect of Conditional Expression (2), it is preferable that Conditional Expression (2-1) is satisfied.

$$-33 < vF1 - vF2 < -18 \quad (2-1)$$

By not allowing the result of Conditional Expression (3) to be equal to or less than the lower limit, it is possible to prevent spherical aberration from increasing on the long focal length side. Thereby, it becomes easy to realize a high zoom ratio. By not allowing the result of Conditional Expression (3) to be equal to or greater than the upper limit, it is possible to reduce lateral chromatic aberration on the wide-angle side. Thereby, there is an advantage in obtaining favorable optical performance. In order to more enhance the effect of Conditional Expression (3), it is preferable that Conditional Expression (3-1) is satisfied.

$$0.13 < NF1 - NF2 < 0.31 \quad (3-1)$$

By selecting a material of the negative lens of the movable lens group that has a negative refractive power and is closest to the first lens group G1 so as to satisfy Conditional Expressions (1) to (3), there is an advantage in correction of chromatic aberration. As a result, it is possible to reduce correction of chromatic aberration of the first lens group G1. That is, it is possible to minimize the number of lenses while satisfactorily correcting chromatic aberration. As a result, it is possible to achieve reduction in size. Further, in the lens system described in patent document 1, in order to correct lateral chromatic aberration on the wide-angle side, the length from the aperture stop to the image plane becomes long, and the total length of the lens becomes long. In contrast, the zoom lens of the present embodiment is configured to satisfactorily correct lateral chromatic aberration on the wide-angle side. Thus, it is possible to minimize the length from the aperture stop St to the image plane Sim.

It is preferable that the zoom lens satisfies Conditional Expression (4) for the front side negative lens group GNF.

$$0.93 < fF2/fGNF < 1.1 \qquad (4)$$

Here, fF2 is a focal length of the second negative lens from the object side in the front side negative lens group, and fGNF is a focal length of the front side negative lens group.

By not allowing the result of Conditional Expression (4) to be equal to or less than the lower limit, it is possible to prevent the power of the second negative lens from the object side in the front side negative lens group GNF from being excessively strong. As a result, it is possible to reduce change in spherical aberration and/or astigmatism caused by zooming. By not allowing the result of Conditional Expression (4) to be equal to or greater than the upper limit, it is possible to prevent the power of the second negative lens from the object side in the front side negative lens group GNF. As a result, it becomes easy to correct lateral chromatic aberration on the wide-angle side. In order to more enhance the effect of Conditional Expression (4), it is more preferable that Conditional Expression (4-1) is satisfied.

$$0.94 < fF2/fGNF < 1.05 \qquad (4\text{-}1)$$

It is preferable that the rear side negative lens group GNR substantially consists of a negative lens and a positive lens. In such a case, it is possible to suppress change in longitudinal chromatic aberration caused by zooming. It should be noted that the rear side negative lens group GNR may be configured to consist of a negative lens and a positive lens in order from the object side, or may be configured to consist of a positive lens and a negative lens in order from the object side.

In a case where the rear side negative lens group GNR substantially consist of a negative lens and a positive lens, it is preferable to satisfy Conditional Expressions (5) and (6).

$$2.395 < NRn + 0.012 \times vRn < 2.495 \qquad (5)$$

$$25 < vRn - vRp < 35 \qquad (6)$$

Here, NRn is a refractive index of the negative lens of the rear side negative lens group at the d line, vRn is an Abbe number of the negative lens of the rear side negative lens group at the d line, and vRp is an Abbe number of the positive lens of the rear side negative lens group at the d line.

By not allowing the result of Conditional Expression (5) to be equal to or less than the lower limit, it is possible to prevent the power of the lens necessary for achromatizing longitudinal chromatic aberration on the wide-angle side from becoming too strong. Thereby, it is possible to suppress change in spherical aberration caused by zooming. By not allowing the result of Conditional Expression (5) to be equal to or greater than the upper limit, it is possible to prevent the power of the lens necessary for longitudinal chromatic aberration on the wide-angle side from becoming too weak, and it is possible to minimize an amount of movement of the movable lens group during zooming. Thus, it becomes easy to realize a high zoom ratio while achieving reduction in size. Further, it is preferable to satisfy Conditional Expression (5-1). By not allowing the result of Conditional Expression (5-1) to be equal to or greater than the upper limit, it is possible to further increase an effect relating to an upper limit of Conditional Expression (5).

$$2.395 < NRn + 0.012 \times vRn2 < 2.455 \qquad (5\text{-}1)$$

By not allowing the result of Conditional Expression (6) to be equal to or less than the lower limit, it is possible to prevent longitudinal chromatic aberration on the wide-angle side from being insufficiently corrected. Thereby, there is an advantage in obtaining favorable optical performance. By not allowing the result of Conditional Expression (6) to be equal to or greater than the upper limit, it is possible to prevent longitudinal chromatic aberration on the wide-angle side from being excessively corrected. Thereby, there is an advantage in obtaining favorable optical performance. In order to more enhance the effect of Conditional Expression (6), it is more preferable that Conditional Expression (6-1) is satisfied.

$$27 < vRn - vRp < 30 \qquad (6\text{-}1)$$

In a case where the rear side negative lens group GNR substantially consists of a negative lens and a positive lens, it is preferable to satisfy Conditional Expression (7).

$$0.35 < fRn/fGNR < 0.51 \qquad (7)$$

Here, fRn is a focal length of the negative lens of the rear side negative lens group, and fGNR is a focal length of the rear side negative lens group.

By not allowing the result of Conditional Expression (7) to be equal to or less than the lower limit, it is possible to prevent the power of the negative lens in the rear side negative lens group GNR from being excessively strong. As a result, it is possible to reduce change in spherical aberration and/or astigmatism caused by zooming. By not allowing the result of Conditional Expression (7) to be equal to or greater than the upper limit, it is possible to prevent the power of the negative lens in the rear side negative lens group GNR from being excessively weak. As a result, it is possible to prevent longitudinal chromatic aberration from being insufficiently corrected. In order to more enhance the effect of Conditional Expression (7), it is more preferable that Conditional Expression (7-1) is satisfied.

$$0.37 < fRn/fGNR < 0.48 \qquad (7\text{-}1)$$

In addition, in the example shown in FIG. 1, the number of plural movable lens groups arranged between the first lens group G1 and the final lens group Ge is two, and these two movable lens groups also have negative refractive powers. In such a case, it is possible to realize a zoom lens having a small size and a high zoom ratio while simplifying the mechanism.

However, the number of plural movable lens groups arranged between the first lens group G1 and the final lens group Ge may be configured to be three or more. For example, the plurality of movable lens groups may be configured to substantially consist of, in order from the object side, a lens group having a positive refractive power, a lens group having a negative refractive power, and a lens group having a negative refractive power. In such a case, it is possible to realize a zoom lens having a small size and a high zoom ratio while suppressing occurrence of distortion on the wide-angle side and/or spherical aberration on the telephoto side. Alternatively, the plurality of movable lens groups may be configured to substantially consist of, in order from the object side, a lens group having a negative refractive power, a lens group having a positive refractive power, and a lens group having a negative refractive power. In such a case, aberrations are easily corrected, and a zoom lens having a small size and a high zoom ratio can be realized.

Further, in the plurality of movable lens groups, it is preferable that a movable lens group closest to the image side has a negative refractive power. In such a case, the movement stroke of the movable lens group located closer to the object side than the movable lens group closest to the image side can be set to be longer while minimizing the total length of the lens system. Thus, there is an advantage in achieving reduction in size and high zoom ratio.

In addition, the zoom lens may be configured to perform focusing when the distance to the object changes, by moving one or more lenses in the first lens group G1 in the direction of the optical axis. As described above, focusing is performed by using a lens closer to the object side than a lens group moving during zooming, and thus it becomes easy to suppress the shift of focus during zooming.

For example, the first lens group G1 of the example shown in FIG. 1 substantially consists of, in order from the object side, a first lens group front group G1a that has a negative refractive power and remains stationary with respect to the image plane Sim during focusing, a first lens group intermediate group G1b that has a positive refractive power and moves in the direction of the optical axis during focusing, and a first lens group rear group G1c that is set such that a distance in the direction of the optical axis between the first lens group rear group G1c and the first lens group intermediate group G1b changes during focusing and has a positive refractive power. In a case of adopting such a configuration, it becomes easy to suppress change in the angle of view caused by focusing. In FIG. 1, both arrows below the first lens group intermediate group G1b indicate that the first lens group intermediate group G1b is movable in the directions of the optical axis during focusing.

In addition, the first lens group rear group G1c may remain stationary with respect to the image plane Sim during focusing. In such a case, the lens groups, which move during focusing, can be composed of a number of only the first lens group intermediate group G1b, and it is possible to simplify the focusing mechanism. Thus, it is possible to suppress an increase in size of the apparatus. Alternatively, the first lens group rear group G1c may move in the direction of the optical axis along a locus different from that of the first lens group intermediate group G1b during focusing. In such a case, it is possible to suppress fluctuation in aberration during focusing.

The first lens group front group G1a may be configured to have, successively in order from a position closest to the object side, a negative meniscus lens concave toward an image side, and a negative lens concave toward the object side. In such a case, it is possible to obtain a negative refractive power necessary for achieving wide angle while suppressing occurrence of astigmatism. The lens closest to the image side in the first lens group front group G1a may be a positive meniscus lens concave toward the image side. In such a case, it is possible to suppress occurrence of astigmatism on the wide-angle side. Further, it is also possible to satisfactorily correct spherical aberration, which is generated by the first lens group front group G1a and has an over tendency on the telephoto side, particularly spherical aberration having a high order which is 5th order or more. As in the example of FIG. 1, the first lens group front group G1a consists of, in order from the object side, a negative meniscus lens, a negative lens, and a positive meniscus lens. These three lenses may be single lenses which are not entirely cemented. In such a case, it is possible to obtain a negative refractive power necessary for achieving wide angle while achieving reduction in size and suppressing occurrence of astigmatism.

It is preferable that the first lens group rear group G1c has, successively in order from the object side, a cemented lens, in which a negative lens and a positive lens are cemented in order from the object side, and a positive lens. In such a case, it becomes easy to correct chromatic aberration of the first lens group G1 and correct spherical aberration on the telephoto side. In addition, in the case where the first lens group rear group G1c is configured to consist of, in order from the object side, a cemented lens, in which a negative lens and a positive lens are cemented in order from the object side, and a positive lens, it is possible to easily correct chromatic aberration of the first lens group G1 and correct spherical aberration on the telephoto side while achieving reduction in size.

The above-mentioned preferred configurations and/or available configurations each may be any combination, and it is preferable to appropriately selectively adopt the configuration in accordance with demands for the zoom lens. By appropriately adopting the configuration, it is possible to realize more favorable optical system. According to the present embodiment, it is possible to realize a zoom lens, which has a small size while ensuring a high zoom ratio and has high optical performance in the entire zooming range by satisfactorily correcting chromatic aberration. It should be noted that the high zoom ratio described herein means 5.5 times or more.

Next, numerical examples of the zoom lens of the present invention will be described.

Example 1

A lens configuration of a zoom lens of Example 1 is shown in FIGS. 1 and 2, and an illustration method thereof is as described above. Therefore, repeated description is partially omitted herein. The zoom lens of Example 1 consists of, in order from the object side, a first lens group G1, a second lens group G2, a third lens group G3, an aperture stop St, and a fourth lens group G4. In these four lens groups, the distances in the direction of the optical axis between groups adjacent to each other change during zooming. Both the second lens group G2 and the third lens group G3 are movable lens groups having negative refractive powers. The first lens group G1 consists of, in order from the object side, a first lens group front group G1a that consists of three lenses and has a negative refractive power, a first lens group intermediate group G1b that consists of two lenses and has a positive refractive power, and a first lens group rear group G1c that consists of three lenses and has a positive refractive power. During focusing, the first lens group front group G1a remains stationary with respect to the image plane Sim, the first lens group intermediate group G1b moves, and the distance in the direction of the optical axis between the first lens group intermediate group G1b and the first lens group rear group G1c changes.

Table 1 shows basic lens data of the zoom lens of Example 1, Table 2 shows values of specification and variable surface distances, and Table 3 shows aspheric coefficients thereof. In Table 1, the column of Si shows a surface number i (i=1, 2, 3, . . . ) attached to an i-th surface of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm), where j sequentially increases toward the image side in a case where the element closest to the object side is regarded as the first element. The column of vdj shows an Abbe number of the j-th element at the d line. The column of θgFj shows a partial dispersion ratio of the j-th element between the g line and the F line.

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of Di indicates a distance between the image plane Sim and the surface closest to the image side in the table. In Table 1, the variable surface distances, which are variable during zooming, are referenced by the reference signs DD[ ], and are written into places of Di, where object side surface numbers of distances are noted in [ ].

In Table 2, values of the zoom ratio Zr, the focal length f of the whole system, the back focal length Bf in terms of the air conversion distance, the F number FNo., the maximum total angle of view 2ω, and variable surface distance are based on the d line. (°) in the place of 2w indicates that the unit thereof is a degree. In Table 2, values in the wide-angle end state, the middle focal length state, and the telephoto end state are respectively shown in the columns labeled by WIDE, MIDDLE, and TELE. The values of Tables 1 and 2 are values in a state where the object at infinity is in focus.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E-n" (n: an integer) in numerical values of the aspheric coefficients of Table 3 indicates "×10$^{-n}$". The aspheric coefficients are values of the coefficients KA and Am (m=3, 4, 5, . . . , 20) in aspheric surface expression represented as the following expression.

$$Zd = \frac{C \times h^2}{1 + \sqrt{1 - KA \times C^2 \times h^2}} + \Sigma Am \times h^m$$

Numerical Expression 1

Here, Zd is an aspheric surface depth (a length of a perpendicular from a point on an aspheric surface at height h to a plane that is perpendicular to the optical axis that contacts with the vertex of the aspheric surface), h is a height (a length of a perpendicular, which is in a plane perpendicular to the optical axis that contacts with the vertex of the aspheric surface, from the point on the aspheric surface to the optical axis), C is a paraxial curvature, and KA and Am are aspheric coefficients.

In data of each table, a degree is used as a unit of an angle, and millimeter (mm) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | vdj | θgFj |
|---|---|---|---|---|---|
| 1 | 370.38276 | 2.53000 | 1.772499 | 49.60 | 0.5521 |
| 2 | 57.75739 | 26.80621 | | | |
| 3 | −152.87368 | 2.20000 | 1.695602 | 59.05 | 0.5435 |
| 4 | 486.73340 | 0.39000 | | | |
| 5 | 103.42182 | 4.56107 | 1.892860 | 20.36 | 0.6394 |
| 6 | 194.06007 | 6.98917 | | | |
| 7 | ∞ | 6.83489 | 1.438750 | 94.66 | 0.5340 |
| 8 | −128.10202 | 0.12000 | | | |
| 9 | 371.48362 | 5.66802 | 1.438750 | 94.66 | 0.5340 |
| 10 | −249.30474 | 9.12857 | | | |
| 11 | 93.94676 | 2.19983 | 1.846660 | 23.88 | 0.6218 |
| 12 | 56.39558 | 16.02634 | 1.438750 | 94.66 | 0.5340 |
| 13 | −130.65476 | 0.12000 | | | |
| 14 | 72.96983 | 5.84576 | 1.695602 | 59.05 | 0.5435 |
| 15 | 264.75541 | DD[15] | | | |
| *16 | 47.39581 | 1.38000 | 1.854000 | 40.38 | 0.5689 |
| 17 | 23.64140 | 7.04442 | | | |
| 18 | −51.14856 | 1.04910 | 1.632460 | 63.77 | 0.5421 |
| 19 | 38.48116 | 5.84592 | | | |
| 20 | 44.54062 | 5.58518 | 1.592701 | 35.31 | 0.5934 |
| 21 | −55.99669 | 1.05000 | 1.592824 | 68.62 | 0.5441 |
| 22 | −270.02836 | DD ]22] | | | |
| 23 | −39.56418 | 1.05000 | 1.632460 | 63.77 | 0.5421 |
| 24 | 44.13413 | 4.04616 | 1.625882 | 35.70 | 0.5893 |
| 25 | −177.97071 | DD[25] | | | |
| 26(St) | ∞ | 1.52068 | | | |
| 27 | 134.91398 | 3.33963 | 1.916500 | 31.60 | 0.5912 |
| 28 | −85.19407 | 0.20018 | | | |
| 29 | 30.90160 | 8.07631 | 1.496999 | 81.54 | 0.5375 |
| 30 | −41.69367 | 1.89903 | 1.910823 | 35.25 | 0.5822 |
| 31 | 85.64653 | 5.33750 | | | |
| 32 | 36.30103 | 6.58324 | 1.749497 | 35.28 | 0.5870 |
| 33 | −105.50860 | 0.99910 | | | |
| 34 | 138.71124 | 1.10000 | 1.900433 | 37.37 | 0.5772 |
| 35 | 18.11707 | 9.50941 | 1.632460 | 63.77 | 0.5421 |
| 36 | −111.49284 | 0.11910 | | | |
| 37 | 39.11125 | 8.33426 | 1.438750 | 94.66 | 0.5340 |
| 38 | −24.02071 | 2.00090 | 1.953748 | 32.32 | 0.5901 |
| 39 | 27.28562 | 18.99884 | | | |
| 40 | 48.65552 | 4.69458 | 1.720467 | 34.71 | 0.5835 |
| 41 | −182.07198 | 0.00000 | | | |
| 42 | ∞ | 2.30000 | 1.516330 | 64.14 | 0.5353 |
| 43 | ∞ | 34.04250 | | | |

TABLE 2

Example 1

| | WIDE | MIDDLE | TELE |
|---|---|---|---|
| Zr | 1.00 | 2.90 | 5.79 |
| f | 20.45 | 59.31 | 118.42 |
| Bf | 35.56 | 35.56 | 35.56 |
| FNo. | 3.32 | 3.32 | 3.32 |
| 2ω(°) | 72.32 | 26.30 | 13.50 |
| DD[15] | 1.54 | 42.02 | 57.17 |
| DD[22] | 47.88 | 7.36 | 5.49 |
| DD[25] | 14.71 | 14.75 | 1.47 |

TABLE 3

Example 1

| Surface Number | 16 |
|---|---|
| KA | 1.0000000E+00 |
| A3 | −1.4481371E−20 |
| A4 | −2.2097151E−06 |
| A5 | 1.1906712E−06 |
| A6 | −2.1344004E−07 |
| A7 | 1.2774506E−08 |
| A8 | 1.1294113E−09 |
| A9 | −2.3286340E−10 |
| A10 | 1.4115083E−11 |
| A11 | 4.6903088E−13 |
| A12 | −1.7545649E−13 |
| A13 | 9.6716937E−15 |
| A14 | 6.5945061E−16 |
| A15 | −7.7270143E−17 |
| A16 | −2.4667346E−19 |
| A17 | 2.3248734E−19 |
| A18 | −4.1986679E−21 |
| A19 | −2.5896844E−22 |
| A20 | 7.5912487E−24 |

FIG. 11 shows aberration diagrams in a state where an object at infinity is brought into focus through the zoom lens of Example 1. In order from the left side of FIG. 11, spherical aberration, astigmatism, distortion, and lateral chromatic aberration (lateral chromatic aberration) are shown. In FIG. 11, the upper part labeled by WIDE shows the zoom lens in the wide-angle end state, the middle part labeled by MIDDLE shows the zoom lens in the middle focal length state, the lower part labeled by TELE shows the zoom lens in the telephoto end state. In the spherical aberration diagram, aberrations at the d line (a wavelength of 587.6 nm), the C line (a wavelength of 656.3 nm), the F line (a wavelength of 486.1 nm), and the g line (a wavelength of 435.8 nm) are respectively indicated by the black solid line, the long dashed line, the chain line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the chain line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 3:
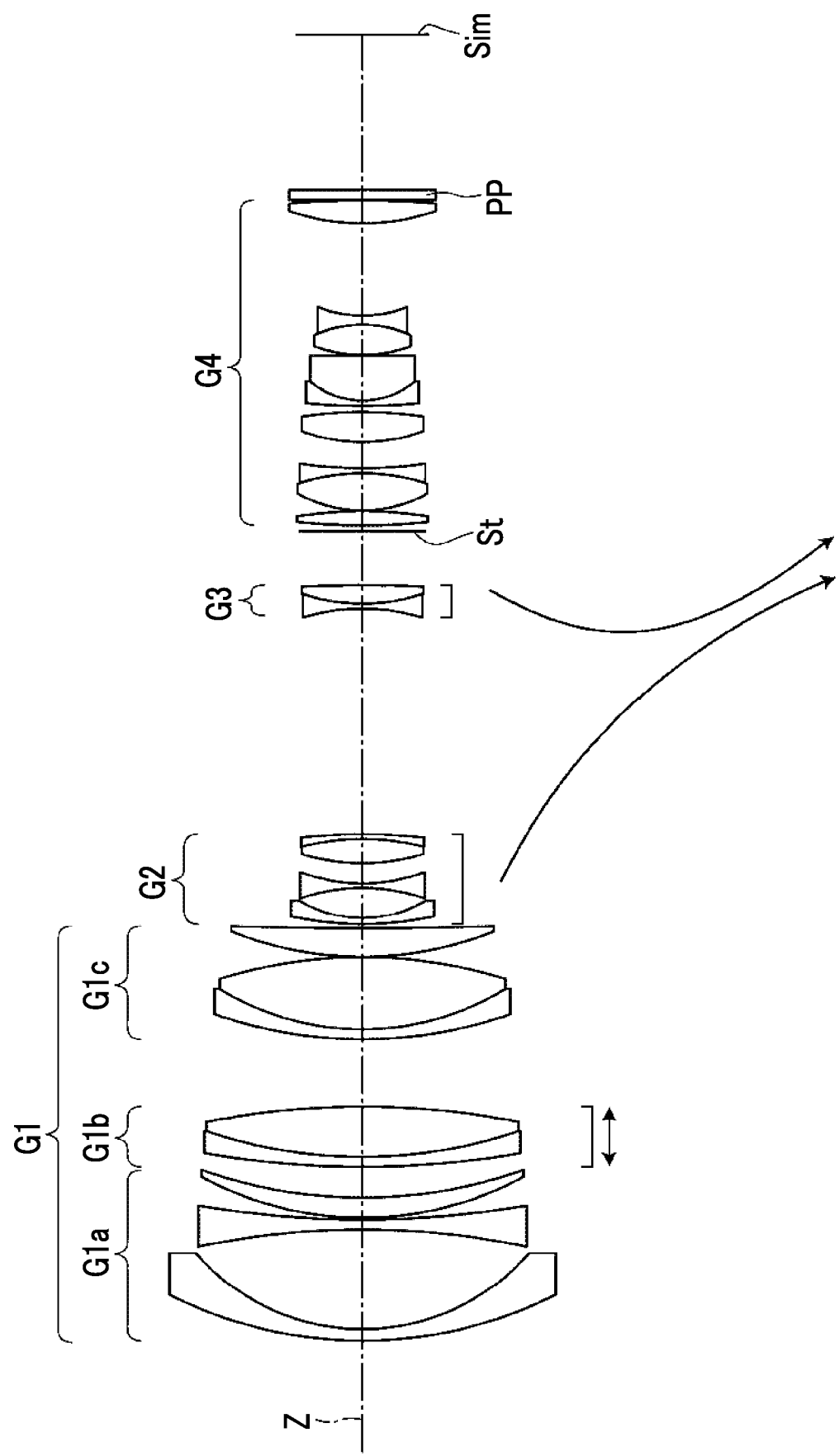
FIG. 3 is a cross-sectional view illustrating a configuration of a zoom lens of Example 2 of the present invention.

FIG. 3 is a cross-sectional view of a zoom lens of Example 2. The zoom lens of Example 2 consists of, in order from the object side, a first lens group G1, a second lens group G2, a third lens group G3, an aperture stop St, and a fourth lens group G4. The first lens group G1 consists of, in order from the object side, a first lens group front group G1a consisting of three lenses, a first lens group intermediate group G1b consisting of two lenses, and a first lens group rear group G1c consisting of three lenses. The present example is the same as Example 1 in terms of the signs of refractive powers of the lens groups, the lens groups moving during zooming, and the lens groups moving during focusing.

Table 4 shows basic lens data of the zoom lens of Example 2, Table 5 shows values of specification and variable surface distances, Table 6 shows aspheric coefficients, and FIG. 12 shows aberration diagrams in a state where the object at infinity is in focus.

TABLE 4

Example 2

| Si | Ri | Di | Ndj | vdj | θgFj |
|---|---|---|---|---|---|
| 1 | 91.92719 | 2.53098 | 1.772499 | 49.60 | 0.5521 |
| 2 | 47.04979 | 22.24446 | | | |
| 3 | −170.66128 | 2.20000 | 1.632460 | 63.77 | 0.5421 |
| 4 | 206.04456 | 0.38503 | | | |
| 5 | 71.99393 | 4.45167 | 1.892860 | 20.36 | 0.6394 |
| 6 | 102.54612 | 6.82807 | | | |
| 7 | 196.27328 | 2.20005 | 1.772499 | 49.60 | 0.5521 |
| 8 | 103.84467 | 11.12110 | 1.438750 | 94.66 | 0.5340 |
| 9 | −171.05234 | 14.89014 | | | |
| 10 | 96.08666 | 2.19923 | 1.854780 | 24.80 | 0.6123 |
| 11 | 58.74401 | 15.93330 | 1.438750 | 94.66 | 0.5340 |
| 12 | −103.69633 | 0.12000 | | | |
| 13 | 75.26293 | 6.27475 | 1.695602 | 59.05 | 0.5435 |
| 14 | 827.30524 | DD[14] | | | |
| *15 | 72.65286 | 1.38000 | 1.854000 | 40.38 | 0.5689 |
| 16 | 25.93821 | 6.72575 | | | |
| 17 | −41.69691 | 1.05070 | 1.592824 | 68.62 | 0.5441 |
| 18 | 37.57713 | 4.48600 | | | |
| 19 | 44.63168 | 5.32952 | 1.592701 | 35.31 | 0.5934 |
| 20 | −52.52729 | 1.05090 | 1.592824 | 68.62 | 0.5441 |
| 21 | −121.55768 | DD[21] | | | |
| 22 | −42.05800 | 1.04975 | 1.632460 | 63.77 | 0.5421 |
| 23 | 39.59542 | 4.12871 | 1.625882 | 35.70 | 0.5893 |
| 24 | −246.96103 | DD[24] | | | |
| 25(St) | ∞ | 1.39983 | | | |
| 26 | 140.44790 | 3.12682 | 1.916500 | 31.60 | 0.5912 |
| 27 | −89.38492 | 0.20011 | | | |
| 28 | 28.98877 | 8.21954 | 1.496999 | 81.54 | 0.5375 |
| 29 | −42.61188 | 1.10000 | 1.910823 | 35.25 | 0.5822 |
| 30 | 90.28815 | 5.81177 | | | |
| 31 | 39.25421 | 6.59993 | 1.749497 | 35.28 | 0.5870 |
| 32 | −89.09971 | 1.37631 | | | |
| 33 | 139.77728 | 1.13913 | 1.900433 | 37.37 | 0.5772 |
| 34 | 17.41563 | 9.99924 | 1.695602 | 59.05 | 0.5435 |
| 35 | −724.38203 | 0.12001 | | | |
| 36 | 29.98468 | 6.67820 | 1.438750 | 94.66 | 0.5340 |
| 37 | −24.61428 | 2.00000 | 1.953748 | 32.32 | 0.5901 |
| 38 | 25.83563 | 20.39478 | | | |
| 39 | 47.76648 | 5.13049 | 1.720467 | 34.71 | 0.5835 |
| 40 | −176.41808 | 0.00000 | | | |
| 41 | ∞ | 2.30000 | 1.516330 | 64.14 | 0.5353 |
| 42 | ∞ | 34.52368 | | | |

TABLE 5

Example 2

| | WIDE | MIDDLE | TELE |
|---|---|---|---|
| Zr | 1.00 | 2.90 | 5.79 |
| f | 20.62 | 59.81 | 119.41 |
| Bf | 36.04 | 36.04 | 36.04 |
| FNo. | 3.31 | 3.31 | 3.30 |
| 2ω(°) | 71.86 | 26.08 | 13.40 |
| DD[14] | 1.00 | 41.46 | 56.83 |
| DD[21] | 49.91 | 8.08 | 4.34 |
| DD[24] | 12.04 | 13.41 | 1.78 |

TABLE 6

Example 2

| Surface Number | 15 |
|---|---|
| KA | 1.0000000E+00 |
| A3 | 0.0000000E+00 |
| A4 | −7.0268357E−07 |
| A5 | −2.8254006E−07 |
| A6 | 1.9442811E−07 |
| A7 | −1.0869783E−08 |
| A8 | −6.5332158E−09 |
| A9 | 1.0648429E−09 |
| A10 | 8.0520025E−12 |
| A11 | −1.2814263E−11 |
| A12 | 6.6704958E−13 |
| A13 | 5.0970812E−14 |
| A14 | −5.3557213E−15 |
| A15 | −3.0887770E−18 |
| A16 | 1.5245419E−17 |
| A17 | −4.1575720E−19 |
| A18 | −1.2158029E−20 |
| A19 | 6.9438881E−22 |
| A20 | −8.1994339E−24 |

Example 3

Figure 4:
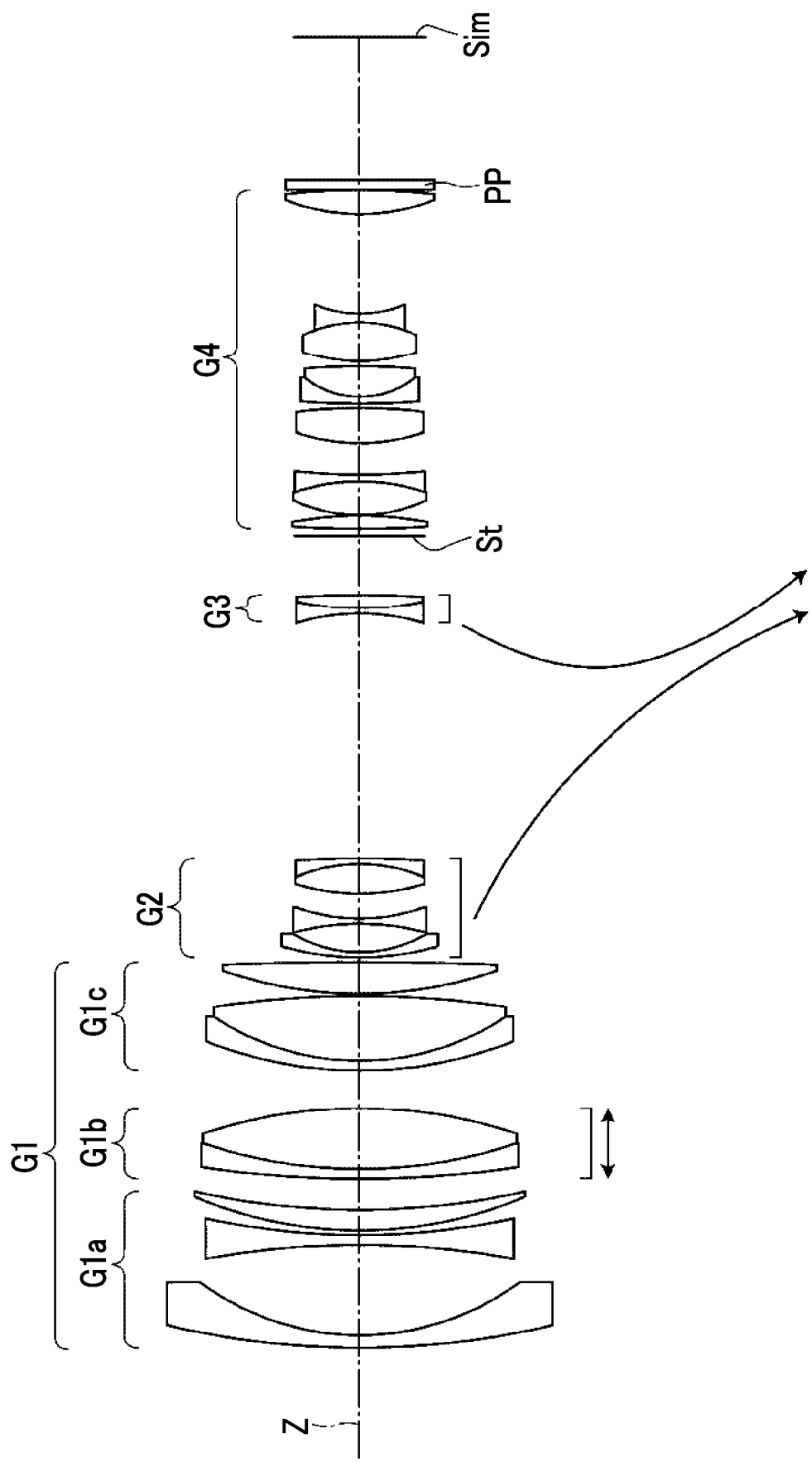
FIG. 4 is a cross-sectional view illustrating a configuration of a zoom lens of Example 3 of the present invention.

FIG. 4 is a cross-sectional view of a zoom lens of Example 3. The zoom lens of Example 3 consists of, in order from the object side, a first lens group G1, a second lens group G2, a third lens group G3, an aperture stop St, and a fourth lens group G4. The first lens group G1 consists of, in order from the object side, a first lens group front group G1a consisting of three lenses, a first lens group intermediate group G1b consisting of two lenses, and a first lens group rear group G1c consisting of three lenses. The present example is the same as Example 1 in terms of the signs of refractive powers of the lens groups, the lens groups moving during zooming, and the lens groups moving during focusing.

Table 7 shows basic lens data of the zoom lens of Example 3, Table 8 shows values of specification and variable surface distances, Table 9 shows aspheric coefficients, and FIG. 13 shows aberration diagrams in a state where the object at infinity is in focus.

TABLE 7

Example 3

| Si | Ri | Di | Ndj | vdj | θgFj |
|---|---|---|---|---|---|
| 1 | 179.73060 | 2.80000 | 1.882997 | 40.76 | 0.5668 |
| 2 | 57.51902 | 19.98932 | | | |
| 3 | −182.56446 | 2.20000 | 1.632460 | 63.77 | 0.5421 |
| 4 | 156.29712 | 1.00000 | | | |
| 5 | 89.75457 | 4.58961 | 1.922860 | 18.90 | 0.6496 |
| 6 | 161.94294 | 6.83969 | | | |
| 7 | 227.04433 | 2.20000 | 1.693717 | 42.53 | 0.5721 |
| 8 | 104.53646 | 13.56898 | 1.438750 | 94.66 | 0.5340 |
| 9 | −104.79903 | 8.44249 | | | |
| 10 | 88.91022 | 2.20000 | 1.805181 | 25.42 | 0.6162 |
| 11 | 56.35834 | 14.33676 | 1.438750 | 94.66 | 0.5340 |
| 12 | −212.00944 | 0.57436 | | | |
| 13 | 90.10716 | 6.95580 | 1.695602 | 59.05 | 0.5435 |
| 14 | −750.39403 | DD[14] | | | |
| *15 | 59.64397 | 1.20000 | 1.902700 | 31.00 | 0.5943 |
| 16 | 28.07287 | 6.22761 | | | |
| 17 | −55.23848 | 1.20000 | 1.632460 | 63.77 | 0.5421 |
| 18 | 39.20503 | 5.53307 | | | |
| 19 | 46.62148 | 6.58080 | 1.592701 | 35.31 | 0.5934 |
| 20 | −34.36365 | 1.20000 | 1.592824 | 68.62 | 0.5441 |
| 21 | −260.67806 | DD[21] | | | |

TABLE 7-continued

Example 3

| Si | Ri | Di | Ndj | vdj | θgFj |
|---|---|---|---|---|---|
| 22 | −44.46367 | 1.20000 | 1.632460 | 63.77 | 0.5421 |
| 23 | 64.72532 | 2.94300 | 1.625882 | 35.70 | 0.5893 |
| 24 | −221.99664 | DD[24] | | | |
| 25(St) | ∞ | 1.60000 | | | |
| 26 | 225.29353 | 2.92131 | 1.916500 | 31.60 | 0.5912 |
| 27 | −75.69537 | 0.12000 | | | |
| 28 | 33.19063 | 7.43192 | 1.496999 | 81.54 | 0.5375 |
| 29 | −42.89577 | 1.50000 | 1.918781 | 36.12 | 0.5784 |
| 30 | 127.40865 | 6.99461 | | | |
| 31 | 40.56322 | 7.82296 | 1.749497 | 35.28 | 0.5870 |
| 32 | −113.63622 | 1.00008 | | | |
| 33 | 166.07425 | 1.50000 | 1.900433 | 37.37 | 0.5772 |
| 34 | 18.91770 | 6.77468 | 1.695602 | 59.05 | 0.5435 |
| 35 | −143.93112 | 1.23445 | | | |
| 36 | 38.97329 | 8.62046 | 1.438750 | 94.66 | 0.5340 |
| 37 | −28.03994 | 2.00000 | 1.953748 | 32.32 | 0.5901 |
| 38 | 24.50898 | 22.08922 | | | |
| 39 | 43.14369 | 5.29015 | 1.628270 | 44.12 | 0.5704 |
| 40 | −162.61439 | 0.00000 | | | |
| 41 | ∞ | 2.30000 | 1.516330 | 64.14 | 0.5353 |
| 42 | ∞ | 31.88502 | | | |

TABLE 8

Example 3

| | WIDE | MIDDLE | TELE |
|---|---|---|---|
| Zr | 1.00 | 2.90 | 5.79 |
| f | 20.71 | 60.06 | 119.92 |
| Bf | 33.40 | 33.40 | 33.40 |
| FNo. | 3.30 | 3.31 | 3.30 |
| 2ω(°) | 71.42 | 25.92 | 13.34 |
| DD[14] | 1.05 | 45.79 | 62.89 |
| DD[21] | 54.63 | 8.29 | 4.17 |
| DD[24] | 13.18 | 14.78 | 1.80 |

TABLE 9

Example 3

| Surface Number | 15 |
|---|---|
| KA | 1.0000000E+00 |
| A4 | −5.4302541E−07 |
| A6 | 2.3244121E−08 |
| A8 | −4.3760338E−10 |
| A10 | 4.9556187E−12 |
| A12 | −3.5362900E−14 |
| A14 | 1.5550030E−16 |
| A16 | −3.9877943E−19 |
| A18 | 5.2706205E−22 |
| A20 | −2.5738294E−25 |

Example 4

Figure 5:
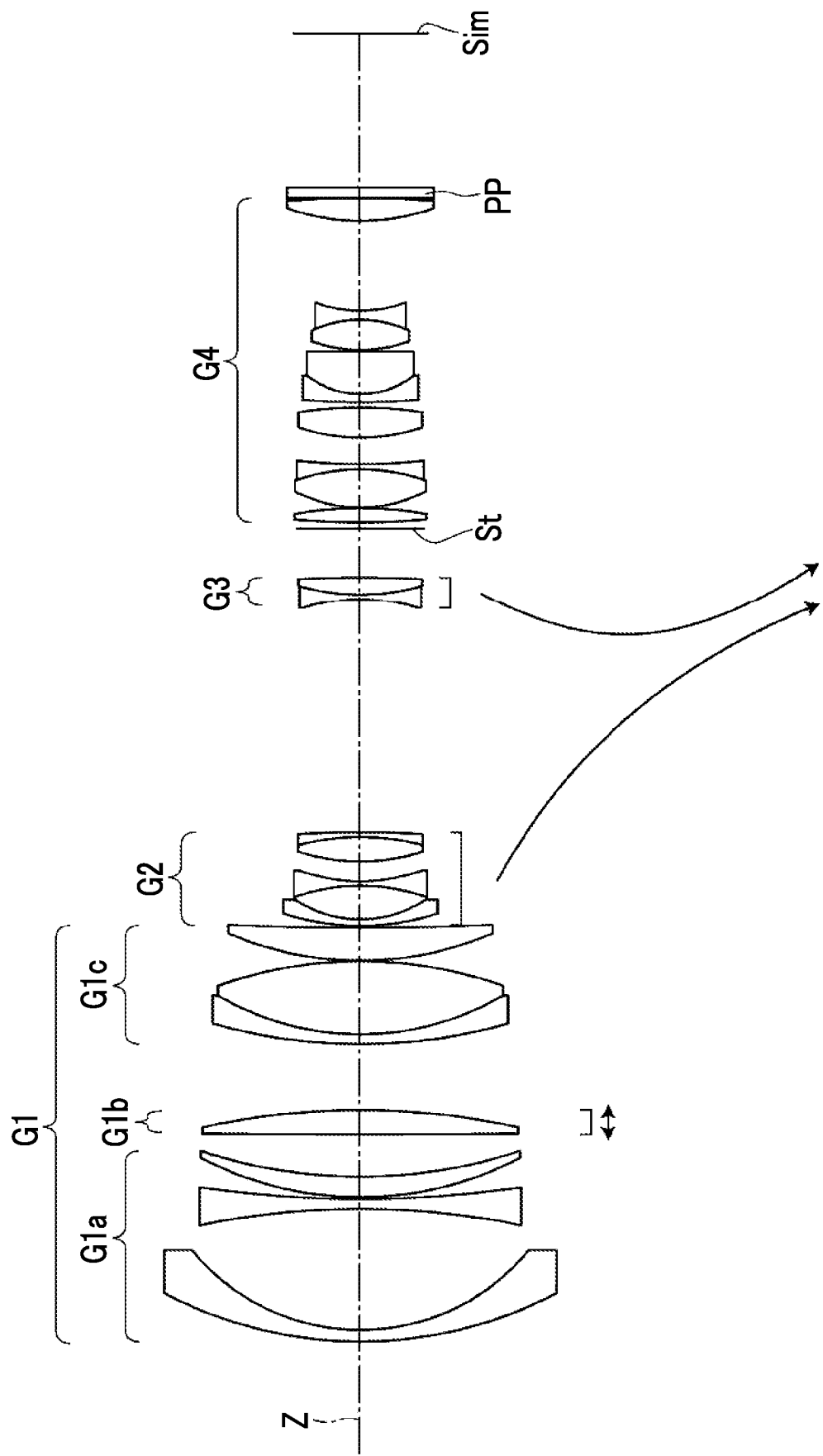
FIG. 5 is a cross-sectional view illustrating a configuration of a zoom lens of Example 4 of the present invention.

FIG. 5 is a cross-sectional view of a zoom lens of Example 4. The zoom lens of Example 4 consists of, in order from the object side, a first lens group G1, a second lens group G2, a third lens group G3, an aperture stop St, and a fourth lens group G4. The first lens group G1 consists of, in order from the object side, a first lens group front group G1a consisting of three lenses, a first lens group intermediate group G1b consisting of one lens, and a first lens group rear group G1c consisting of three lenses. The present example is the same as Example 1 in terms of the signs of refractive powers of the lens groups, the lens groups moving during zooming, and the lens groups moving during focusing.

Table 10 shows basic lens data of the zoom lens of Example 4, Table 11 shows values of specification and variable surface distances, Table 12 shows aspheric coefficients, and FIG. 14 shows aberration diagrams in a state where the object at infinity is in focus.

TABLE 10

Example 4

| Si | Ri | Di | Ndj | vdj | θgFj |
|---|---|---|---|---|---|
| 1 | 89.55061 | 2.53098 | 1.772499 | 49.60 | 0.5521 |
| 2 | 46.20108 | 26.48567 | | | |
| 3 | −170.63384 | 2.20059 | 1.695602 | 59.05 | 0.5435 |
| 4 | 232.43449 | 0.39804 | | | |
| 5 | 72.57068 | 4.47015 | 1.892860 | 20.36 | 0.6394 |
| 6 | 106.19898 | 9.28374 | | | |
| 7 | 2685.83228 | 5.32667 | 1.438750 | 94.66 | 0.5340 |
| 8 | −153.59919 | 14.66212 | | | |
| 9 | 113.63731 | 2.16853 | 1.854780 | 24.80 | 0.6123 |
| 10 | 59.63066 | 15.98231 | 1.438750 | 94.66 | 0.5340 |
| 11 | −90.12780 | 0.14311 | | | |
| 12 | 70.15326 | 7.22393 | 1.695602 | 59.05 | 0.5435 |
| 13 | 661.14022 | DD[13] | | | |
| *14 | 52.60017 | 1.38000 | 1.854000 | 40.38 | 0.5689 |
| 15 | 24.43846 | 7.35169 | | | |
| 16 | −41.94664 | 1.05070 | 1.592824 | 68.62 | 0.5441 |
| 17 | 37.98271 | 4.32904 | | | |
| 18 | 43.08412 | 5.54251 | 1.592701 | 35.31 | 0.5934 |
| 19 | −50.53315 | 1.05090 | 1.592824 | 68.62 | 0.5441 |
| 20 | −188.16409 | DD[20] | | | |
| 21 | −40.22044 | 1.05085 | 1.632460 | 63.77 | 0.5421 |
| 22 | 45.33398 | 3.77263 | 1.625882 | 35.70 | 0.5893 |
| 23 | −236.50416 | DD[23] | | | |
| 24(St) | ∞ | 1.40031 | | | |
| 25 | 167.28051 | 3.05237 | 1.916500 | 31.60 | 0.5912 |
| 26 | −82.28668 | 0.20010 | | | |
| 27 | 29.42802 | 8.35992 | 1.496999 | 81.54 | 0.5375 |
| 28 | −39.92973 | 1.11193 | 1.910823 | 35.25 | 0.5822 |
| 29 | 109.93898 | 5.82991 | | | |
| 30 | 40.35878 | 6.58497 | 1.749497 | 35.28 | 0.5870 |
| 31 | −84.78434 | 1.14152 | | | |
| 32 | 135.35453 | 1.80010 | 1.900433 | 37.37 | 0.5772 |
| 33 | 17.94607 | 9.53921 | 1.695602 | 59.05 | 0.5435 |
| 34 | −613.17875 | 0.38246 | | | |
| 35 | 30.56287 | 6.55776 | 1.438750 | 94.66 | 0.5340 |
| 36 | −23.83965 | 1.99868 | 1.953748 | 32.32 | 0.5901 |
| 37 | 25.94805 | 19.72576 | | | |
| 38 | 46.63103 | 4.99544 | 1.720467 | 34.71 | 0.5835 |
| 39 | −193.04666 | 0.00000 | | | |
| 40 | ∞ | 2.30000 | 1.516330 | 64.14 | 0.5353 |
| 41 | ∞ | 33.97254 | | | |

TABLE 11

Example 4

| | WIDE | MIDDLE | TELE |
|---|---|---|---|
| Zr | 1.00 | 2.90 | 5.79 |
| f | 20.40 | 59.15 | 118.09 |
| Bf | 35.49 | 35.49 | 35.49 |
| FNo. | 3.31 | 3.31 | 3.30 |
| 2ω(°) | 72.42 | 26.38 | 13.56 |
| DD[13] | 0.41 | 41.66 | 57.48 |
| DD[20] | 51.15 | 8.62 | 3.96 |
| DD[23] | 10.75 | 12.04 | 0.88 |

TABLE 12

Example 4

| Surface Number | 14 |
|---|---|
| KA | 1.0000000E+00 |
| A3 | 0.0000000E+00 |

TABLE 12-continued

Example 4

| Surface Number | 14 |
|---|---|
| A4 | −7.0268357E−07 |
| A5 | −2.8254006E−07 |
| A6 | 1.9442811E−07 |
| A7 | −1.0869783E−08 |
| A8 | −6.5332158E−09 |
| A9 | 1.0648429E−09 |
| A10 | 8.0520025E−12 |
| A11 | −1.2814263E−11 |
| A12 | 6.6704958E−13 |
| A13 | 5.0970812E−14 |
| A14 | −5.3557213E−15 |
| A15 | −3.0887770E−18 |
| A16 | 1.5245419E−17 |
| A17 | −4.1575720E−19 |
| A18 | −1.2158029E−20 |
| A19 | 6.9438881E−22 |
| A20 | −8.1994339E−24 |

Example 5

Figure 6:
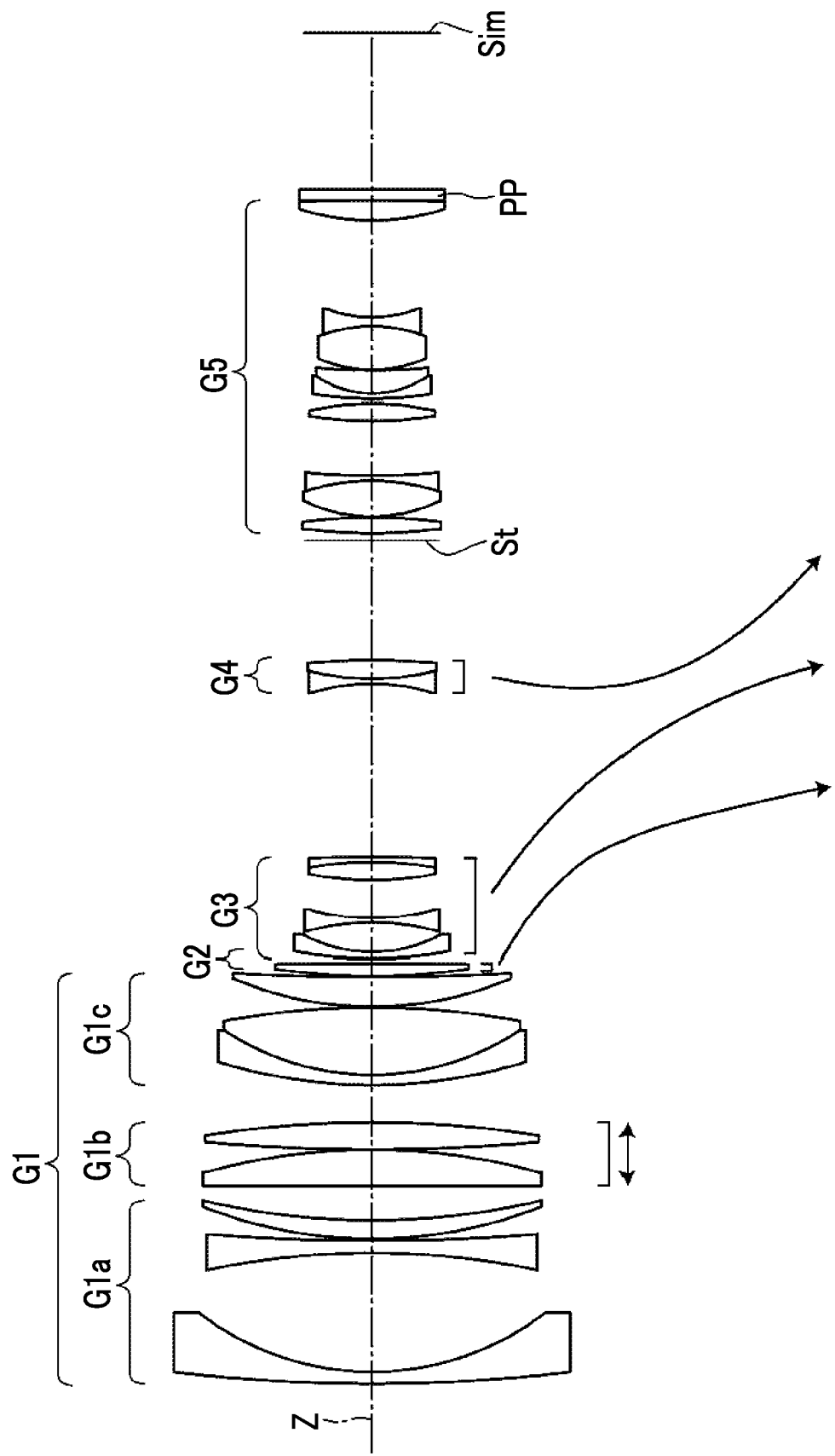
FIG. 6 is a cross-sectional view illustrating a configuration of a zoom lens of Example 5 of the present invention.

FIG. 6 is a cross-sectional view of a zoom lens of Example 5. The zoom lens of Example 5 consists of, in order from the object side, a first lens group G1, a second lens group G2, a third lens group G3, a fourth lens group G4, an aperture stop St, and a fifth lens group G5. In these five lens groups, the distances in the direction of the optical axis between groups adjacent to each other change during zooming. The second lens group G2 has a positive refractive power, the third lens group G3 has a negative refractive power, and the fourth lens group G4 has a negative refractive power. The three lens groups including the second to fourth lens groups G2 to G4 are respectively movable lens groups. The first lens group G1 consists of, in order from the object side, a first lens group front group G1a consisting of three lenses, a first lens group intermediate group G1b consisting of two lenses, and a first lens group rear group G1c consisting of three lenses. The signs of the refractive powers of three lens groups composing the first lens group G1 and the lens groups moving during focusing are the same as that of Example 1.

Figure 15:
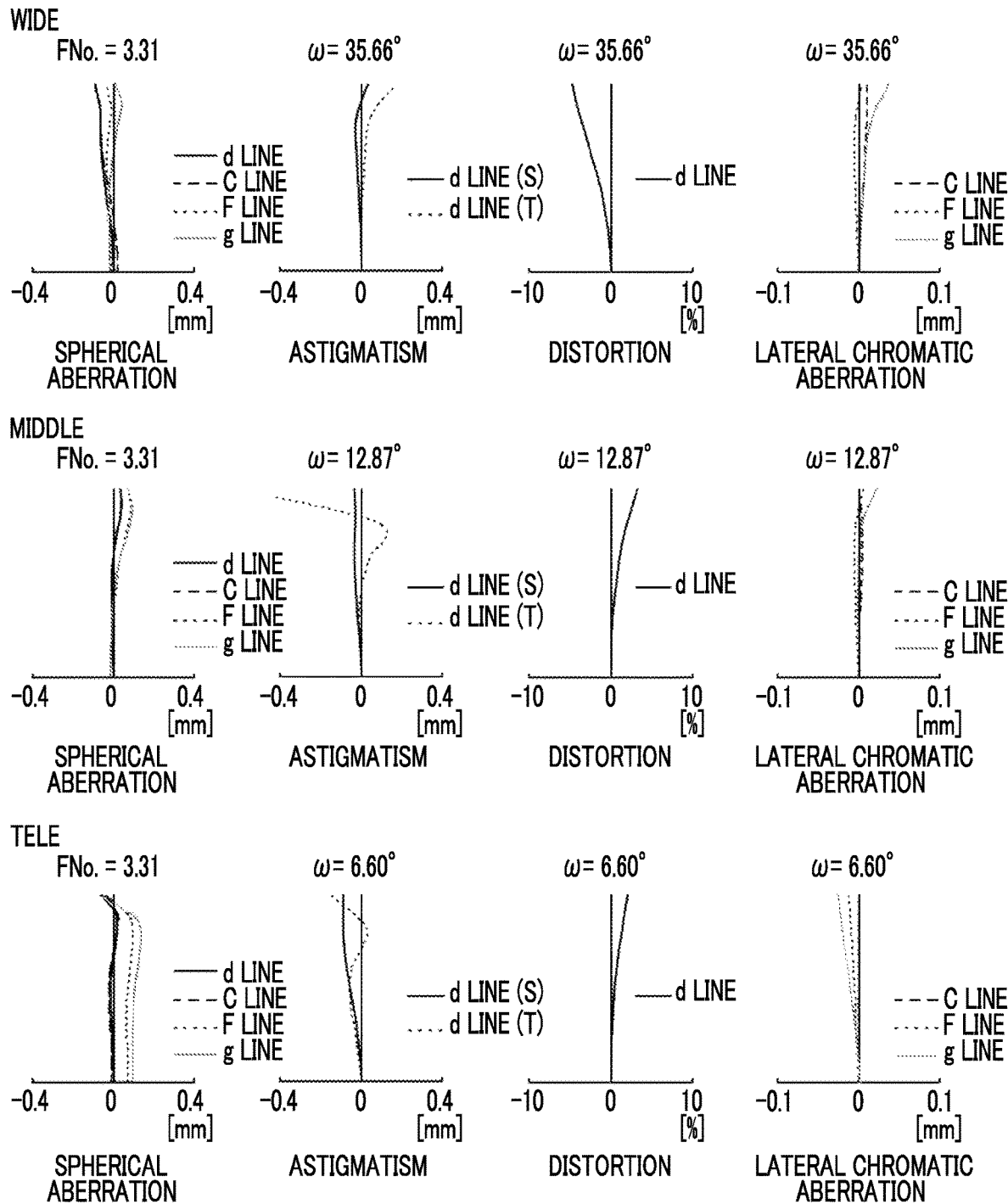
FIG. 15 is a diagram of aberrations of the zoom lens according to Example 5 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 13 shows basic lens data of the zoom lens of Example 5, Table 14 shows values of specification and variable surface distances, and FIG. 15 shows aberration diagrams in a state where the infinite object is in focus.

TABLE 13

Example 5

| Si | Ri | Di | Ndj | vdj | θgFj |
|---|---|---|---|---|---|
| 1 | 351.51134 | 2.53000 | 1.772499 | 49.60 | 0.5521 |
| 2 | 58.96679 | 25.71058 | | | |
| 3 | −165.96934 | 2.60041 | 1.695602 | 59.05 | 0.5435 |
| 4 | 438.51863 | 0.38517 | | | |
| 5 | 96.24927 | 3.97797 | 1.892860 | 20.36 | 0.6394 |
| 6 | 152.74199 | 7.45066 | | | |
| 7 | ∞ | 7.63521 | 1.438750 | 94.66 | 0.5340 |
| 8 | −131.92076 | 0.12000 | | | |
| 9 | 409.13255 | 5.76407 | 1.438750 | 94.66 | 0.5340 |
| 10 | −220.57814 | 7.99290 | | | |
| 11 | 108.72751 | 2.20000 | 1.755199 | 27.51 | 0.6103 |
| 12 | 55.83386 | 14.41684 | 1.438750 | 94.66 | 0.5340 |
| 13 | −168.55158 | 0.12000 | | | |
| 14 | 73.70666 | 6.42934 | 1.632460 | 63.77 | 0.5421 |
| 15 | 597.12639 | DD[15] | | | |

TABLE 13-continued

Example 5

| Si | Ri | Di | Ndj | vdj | θgFj |
|---|---|---|---|---|---|
| 16 | 137.71857 | 2.63139 | 1.496999 | 81.54 | 0.5375 |
| 17 | −1305.73558 | DD[17] | | | |
| 18 | 87.40326 | 1.38000 | 1.834807 | 42.72 | 0.5649 |
| 19 | 30.33959 | 6.29623 | | | |
| 20 | −51.31471 | 1.05000 | 1.695602 | 59.05 | 0.5435 |
| 21 | 48.76135 | 8.19661 | | | |
| 22 | 68.58699 | 3.87635 | 1.698947 | 30.13 | 0.6030 |
| 23 | −74.53716 | 1.06000 | 1.695602 | 59.05 | 0.5435 |
| 24 | −291.58007 | DD[24] | | | |
| 25 | −41.67152 | 1.05055 | 1.632460 | 63.77 | 0.5421 |
| 26 | 53.61308 | 3.93485 | 1.625882 | 35.70 | 0.5893 |
| 27 | −158.08561 | DD[27] | | | |
| 28(St) | ∞ | 1.72135 | | | |
| 29 | 112.40514 | 3.36815 | 1.916500 | 31.60 | 0.5912 |
| 30 | −107.74797 | 0.20079 | | | |
| 31 | 32.65637 | 7.66863 | 1.496999 | 81.54 | 0.5375 |
| 32 | −44.13940 | 1.10000 | 1.910823 | 35.25 | 0.5822 |
| 33 | 146.04040 | 11.71151 | | | |
| 34 | 88.13789 | 3.58259 | 1.749497 | 35.28 | 0.5870 |
| 35 | −61.95479 | 0.99901 | | | |
| 36 | 81.54848 | 1.10000 | 1.900433 | 37.37 | 0.5772 |
| 37 | 20.55629 | 4.91890 | 1.632460 | 63.77 | 0.5421 |
| 38 | 122.56273 | 0.12011 | | | |
| 39 | 27.72661 | 9.31235 | 1.438750 | 94.66 | 0.5340 |
| 40 | −30.83758 | 1.99952 | 1.953748 | 32.32 | 0.5901 |
| 41 | 28.75987 | 20.68485 | | | |
| 42 | 49.85885 | 4.26967 | 1.720467 | 34.71 | 0.5835 |
| 43 | −342.76867 | 0.00000 | | | |
| 44 | ∞ | 2.30000 | 1.516330 | 64.14 | 0.5353 |
| 45 | ∞ | 33.79607 | | | |

TABLE 14

Example 5

| | WIDE | MIDDLE | TELE |
|---|---|---|---|
| Zr | 1.00 | 2.90 | 5.79 |
| f | 20.84 | 60.43 | 120.65 |
| Bf | 35.31 | 35.31 | 35.31 |
| FNo. | 3.31 | 3.31 | 3.31 |
| 2ω(°) | 71.32 | 25.74 | 13.20 |
| DD[15] | 0.15 | 24.27 | 35.03 |
| DD[17] | 1.00 | 14.99 | 18.97 |
| DD[24] | 37.14 | 3.28 | 8.30 |
| DD[27] | 25.73 | 21.48 | 1.71 |

Example 6

Figure 7:
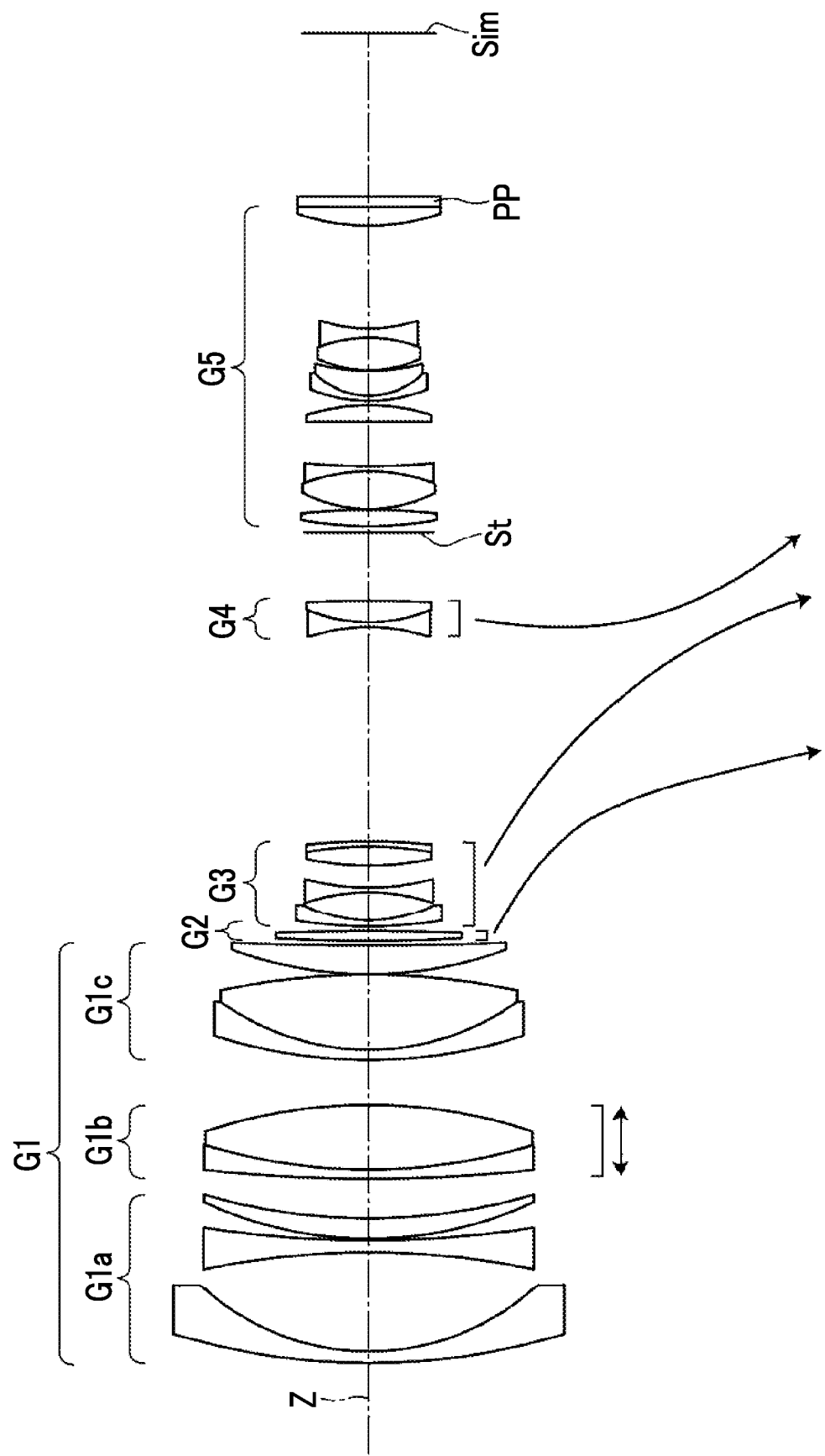
FIG. 7 is a cross-sectional view illustrating a configuration of a zoom lens of Example 6 of the present invention.

FIG. 7 is a cross-sectional view of a zoom lens of Example 6. The zoom lens of Example 6 consists of, in order from the object side, a first lens group G1, a second lens group G2, a third lens group G3, a fourth lens group G4, an aperture stop St, and a fifth lens group G5. The first lens group G1 consists of, in order from the object side, a first lens group front group G1a consisting of three lenses, a first lens group intermediate group G1b consisting of two lenses, and a first lens group rear group G1c consisting of three lenses. The present example is the same as Example 5 in terms of the signs of refractive powers of the lens groups, the lens groups moving during zooming, and the lens groups moving during focusing.

Table 15 shows basic lens data of the zoom lens of Example 6, Table 16 shows values of specification and variable surface distances, and FIG. 16 shows aberration diagrams in a state where the infinite object is in focus.

TABLE 15

Example 6

| Si | Ri | Di | Ndj | vdj | θgFj |
|---|---|---|---|---|---|
| 1 | 141.52029 | 2.53000 | 1.772499 | 49.60 | 0.5521 |
| 2 | 52.25093 | 21.72306 | | | |
| 3 | −169.76115 | 2.60000 | 1.695602 | 59.05 | 0.5435 |
| 4 | 227.38169 | 0.38500 | | | |
| 5 | 82.77517 | 4.42635 | 1.892860 | 20.36 | 0.6394 |
| 6 | 124.35002 | 8.58347 | | | |
| 7 | 327.66786 | 2.00000 | 1.755199 | 27.51 | 0.6103 |
| 8 | 118.32799 | 14.02000 | 1.496999 | 81.54 | 0.5375 |
| 9 | −110.23986 | 9.77811 | | | |
| 10 | 106.66417 | 2.22000 | 1.592701 | 35.31 | 0.5934 |
| 11 | 53.48612 | 16.28831 | 1.438750 | 94.66 | 0.5340 |
| 12 | −149.79662 | 0.12001 | | | |
| 13 | 82.59842 | 6.25291 | 1.695602 | 59.05 | 0.5435 |
| 14 | 756.00928 | DD[14] | | | |
| 15 | 336.83164 | 2.18103 | 1.496999 | 81.54 | 0.5375 |
| 16 | −474.99451 | DD[16] | | | |
| 17 | 92.73731 | 1.38000 | 1.882997 | 40.76 | 0.5668 |
| 18 | 31.26761 | 6.12521 | | | |
| 19 | −41.83728 | 1.05000 | 1.695602 | 59.05 | 0.5435 |
| 20 | 50.59877 | 4.82631 | | | |
| 21 | 62.85436 | 4.13921 | 1.698947 | 30.13 | 0.6030 |
| 22 | −71.03230 | 1.06003 | 1.695602 | 59.05 | 0.5435 |
| 23 | −133.54667 | DD[23] | | | |
| 24 | −39.50225 | 1.04910 | 1.632460 | 63.77 | 0.5421 |
| 25 | 33.98929 | 4.61700 | 1.625882 | 35.70 | 0.5893 |
| 26 | −303.50782 | DD[26] | | | |
| 27(St) | ∞ | 1.40000 | | | |
| 28 | 81.21019 | 3.54813 | 1.916500 | 31.60 | 0.5912 |
| 29 | −126.01058 | 0.19910 | | | |
| 30 | 30.62497 | 8.16831 | 1.496999 | 81.54 | 0.5375 |
| 31 | −38.67212 | 1.10094 | 1.910823 | 35.25 | 0.5822 |
| 32 | 149.32004 | 9.64313 | | | |
| 33 | 224495.80575 | 3.55897 | 1.749497 | 35.28 | 0.5870 |
| 34 | −44.18529 | 1.00088 | | | |
| 35 | 32.84667 | 1.10000 | 1.900433 | 37.37 | 0.5772 |
| 36 | 16.11826 | 5.42939 | 1.632460 | 63.77 | 0.5421 |
| 37 | 44.78303 | 0.12000 | | | |
| 38 | 25.73387 | 7.06096 | 1.438750 | 94.66 | 0.5340 |
| 39 | −28.99748 | 2.00000 | 1.953748 | 32.32 | 0.5901 |
| 40 | 32.42687 | 22.34713 | | | |
| 41 | 46.93465 | 4.05539 | 1.720467 | 34.71 | 0.5835 |
| 42 | 843.22322 | 0.00000 | | | |
| 43 | ∞ | 2.30000 | 1.516330 | 64.14 | 0.5353 |
| 44 | ∞ | 35.59573 | | | |

TABLE 16

Example 6

| | WIDE | MIDDLE | TELE |
|---|---|---|---|
| Zr | 1.00 | 2.90 | 5.79 |
| f | 20.81 | 60.36 | 120.52 |
| Bf | 37.11 | 37.11 | 37.11 |
| FNo. | 3.31 | 3.31 | 3.31 |
| 2ω(°) | 71.30 | 25.82 | 13.26 |
| DD[14] | 1.00 | 27.09 | 39.25 |
| DD[16] | 1.00 | 15.00 | 18.97 |
| DD[23] | 46.61 | 7.17 | 3.58 |
| DD[26] | 15.08 | 14.43 | 1.89 |

Example 7

Figure 8:
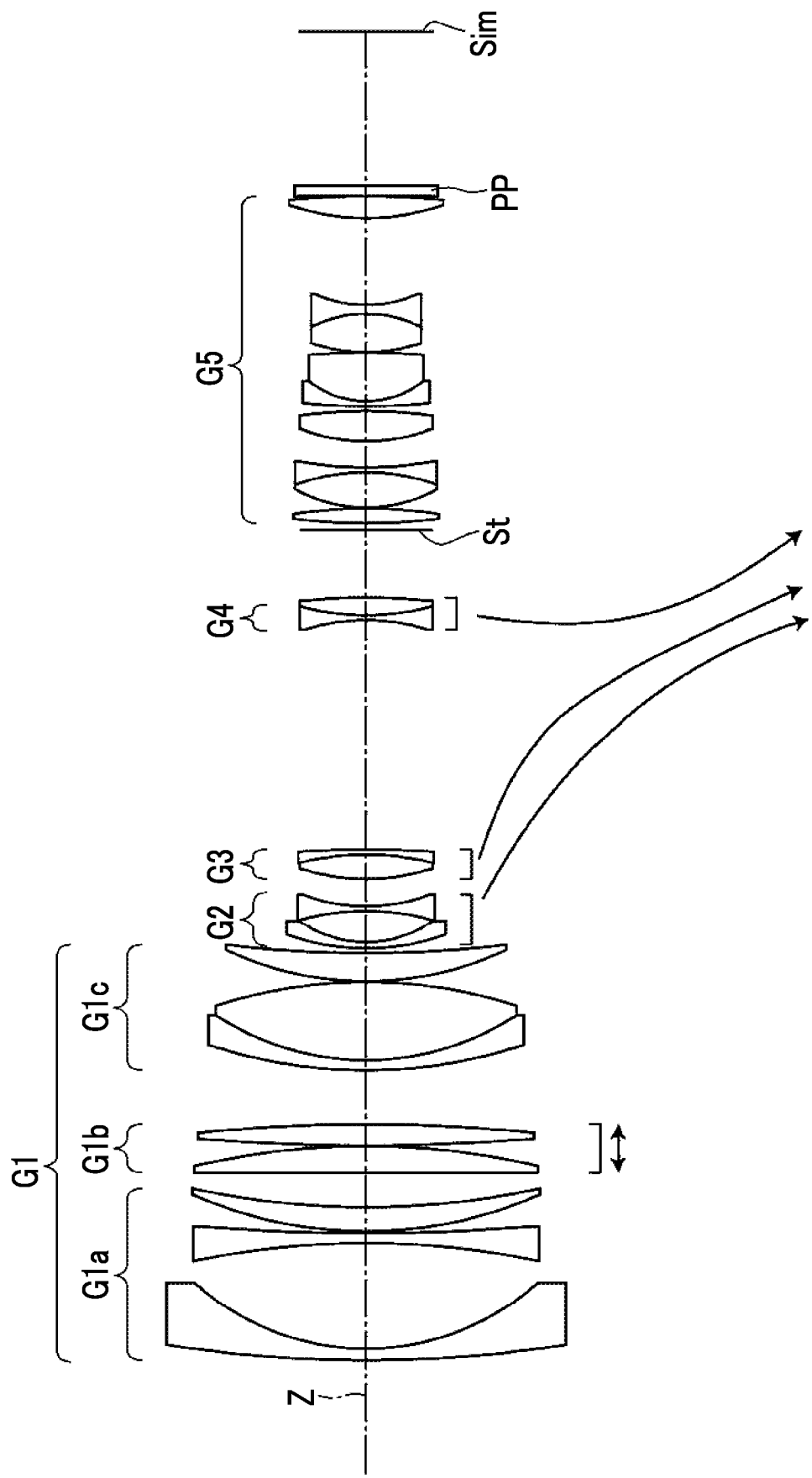
FIG. 8 is a cross-sectional view illustrating a configuration of a zoom lens of Example 7 of the present invention.

FIG. 8 is a cross-sectional view of a zoom lens of Example 7. The zoom lens of Example 7 consists of, in order from the object side, a first lens group G1, a second lens group G2, a third lens group G3, a fourth lens group G4, an aperture stop St, and a fifth lens group G5. In these five lens groups, the distances in the direction of the optical axis between groups adjacent to each other change during zooming. The second lens group G2 has a negative refractive power, the third lens group G3 has a positive refractive power, and the fourth lens group G4 has a negative refractive power. The three lens groups including the second to fourth lens groups G2 to G4 are respectively movable lens groups. The first lens group G1 consists of, in order from the object side, a first lens group front group G1a consisting of three lenses, a first lens group intermediate group G1b consisting of two lenses, and a first lens group rear group G1c consisting of three lenses. The signs of the refractive powers of three lens groups composing the first lens group G1 and the lens groups moving during focusing are the same as that of Example 1.

Table 17 shows basic lens data of the zoom lens of Example 7, Table 18 shows values of specification and variable surface distances, Table 19 shows aspheric coefficients, and FIG. 17 shows aberration diagrams in a state where the object at infinity is in focus.

TABLE 17

Example 7

| Si | Ri | Di | Ndj | vdj | θgFj |
|---|---|---|---|---|---|
| 1 | 271.02397 | 2.53000 | 1.772499 | 49.60 | 0.5521 |
| 2 | 53.66770 | 23.14907 | | | |
| 3 | −176.86065 | 2.20000 | 1.695602 | 59.05 | 0.5435 |
| 4 | 430.29449 | 0.39000 | | | |
| 5 | 90.80833 | 5.23373 | 1.892860 | 20.36 | 0.6394 |
| 6 | 172.69777 | 7.52493 | | | |
| 7 | ∞ | 5.76344 | 1.438750 | 94.66 | 0.5340 |
| 8 | −157.36129 | 0.12000 | | | |
| 9 | 432.45221 | 4.57630 | 1.438750 | 94.66 | 0.5340 |
| 10 | −351.96925 | 11.77482 | | | |
| 11 | 105.41212 | 2.19983 | 1.846660 | 23.88 | 0.6218 |
| 12 | 57.91535 | 16.99595 | 1.438750 | 94.66 | 0.5340 |
| 13 | −102.71103 | 0.12000 | | | |
| 14 | 68.91116 | 6.18166 | 1.695602 | 59.05 | 0.5435 |
| 15 | 251.51097 | DD[15] | | | |
| *16 | 48.87312 | 1.38000 | 1.854000 | 40.38 | 0.5689 |
| 17 | 23.92316 | 6.92527 | | | |
| 18 | −51.61678 | 1.04910 | 1.632460 | 63.77 | 0.5421 |
| 19 | 37.81667 | DD[19] | | | |
| 20 | 45.09991 | 5.27163 | 1.592701 | 35.31 | 0.5934 |
| 21 | −57.23178 | 1.05000 | 1.592824 | 68.62 | 0.5441 |
| 22 | −271.05488 | DD[22] | | | |
| 23 | −42.52742 | 1.05000 | 1.632460 | 63.77 | 0.5421 |
| 24 | 52.07641 | 3.85263 | 1.625882 | 35.70 | 0.5893 |
| 25 | −137.87042 | DD[25] | | | |
| 26(St) | ∞ | 1.47098 | | | |
| 27 | 125.78267 | 3.21681 | 1.916500 | 31.60 | 0.5912 |
| 28 | −97.17131 | 0.20021 | | | |
| 29 | 30.88167 | 7.64434 | 1.496999 | 81.54 | 0.5375 |
| 30 | −44.27610 | 1.10005 | 1.910823 | 35.25 | 0.5822 |
| 31 | 79.59338 | 5.66259 | | | |
| 32 | 38.09474 | 6.60000 | 1.749497 | 35.28 | 0.5870 |
| 33 | −103.42350 | 0.99912 | | | |
| 34 | 128.80899 | 1.10081 | 1.900433 | 37.37 | 0.5772 |
| 35 | 19.22646 | 10.52353 | 1.632460 | 63.77 | 0.5421 |
| 36 | −168.57645 | 0.12032 | | | |
| 37 | 35.68369 | 8.40999 | 1.438750 | 94.66 | 0.5340 |
| 38 | −24.74904 | 1.88371 | 1.953748 | 32.32 | 0.5901 |
| 39 | 26.58345 | 18.87835 | | | |
| 40 | 48.89032 | 4.75127 | 1.720467 | 34.71 | 0.5835 |
| 41 | −161.77170 | 0.00000 | | | |
| 42 | ∞ | 2.30000 | 1.516330 | 64.14 | 0.5353 |
| 43 | ∞ | 33.69711 | | | |

TABLE 18

Example 7

| | WIDE | MIDDLE | TELE |
|---|---|---|---|
| Zr | 1.00 | 2.90 | 5.79 |
| f | 20.24 | 58.69 | 117.18 |

TABLE 18-continued

Example 7

| | WIDE | MIDDLE | TELE |
|---|---|---|---|
| Bf | 35.21 | 35.21 | 35.21 |
| FNo. | 3.32 | 3.32 | 3.32 |
| 2ω(°) | 72.92 | 26.56 | 13.64 |
| DD[15] | 1.00 | 42.53 | 58.14 |
| DD[19] | 5.98 | 6.34 | 5.90 |
| DD[22] | 49.90 | 6.95 | 6.47 |
| DD[25] | 14.92 | 15.98 | 1.29 |

TABLE 19

Example 7

| Surface Number | 16 |
|---|---|
| KA | 1.0000000E+00 |
| A3 | −1.4481371E−20 |
| A4 | −2.2097151E−06 |
| A5 | 1.1906712E−06 |
| A6 | −2.1344004E−07 |
| A7 | 1.2774506E−08 |
| A8 | 1.1294113E−09 |
| A9 | −2.3286340E−10 |
| A10 | 1.4115083E−11 |
| A11 | 4.6903088E−13 |
| A12 | −1.7545649E−13 |
| A13 | 9.6716937E−15 |
| A14 | 6.5945061E−16 |
| A15 | −7.7270143E−17 |
| A16 | −2.4667346E−19 |
| A17 | 2.3248734E−19 |
| A18 | −4.1986679E−21 |
| A19 | −2.5896844E−22 |
| A20 | 7.5912487E−24 |

Example 8

Figure 9:
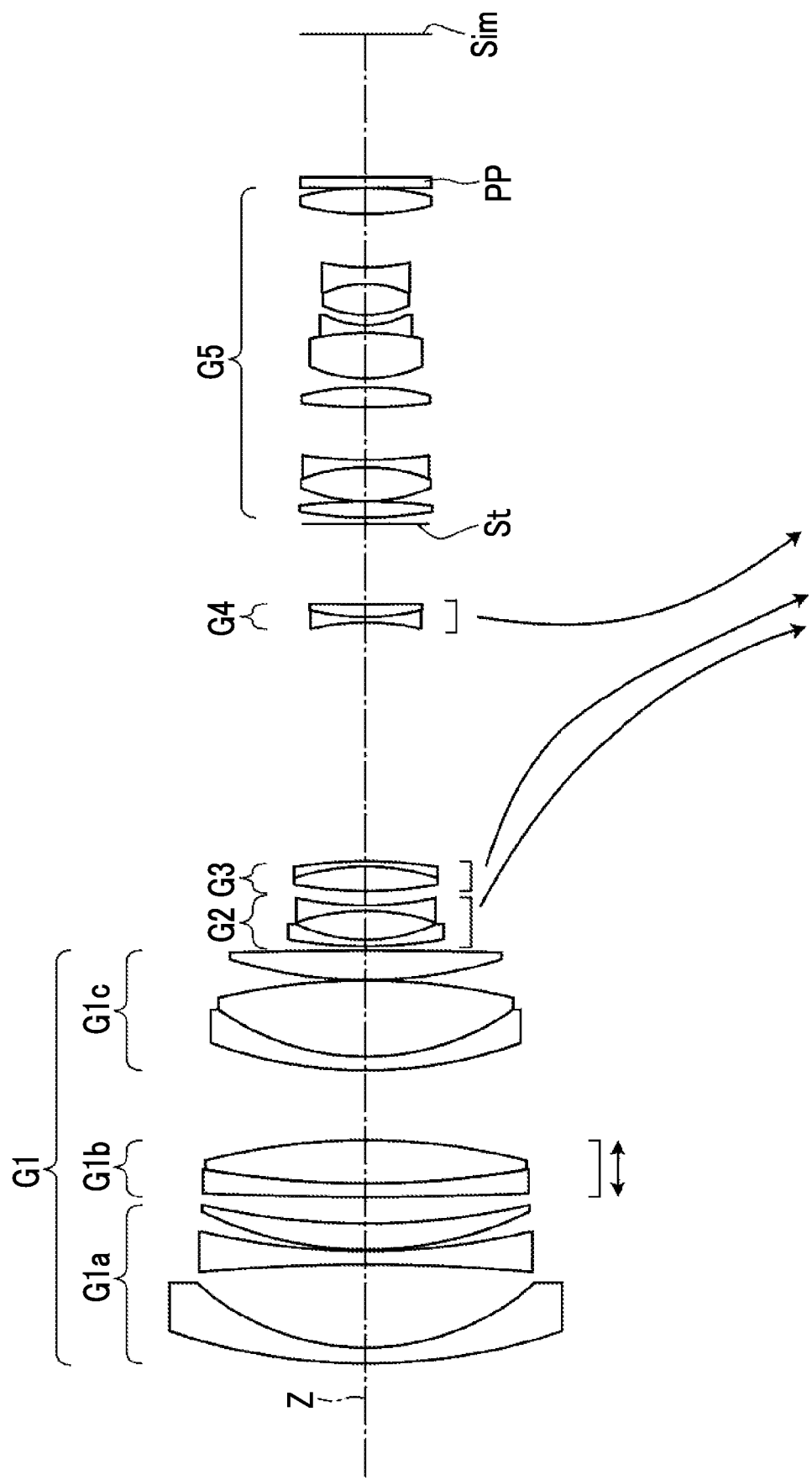
FIG. 9 is a cross-sectional view illustrating a configuration of a zoom lens of Example 8 of the present invention.

FIG. 9 is a cross-sectional view of a zoom lens of Example 8. The zoom lens of Example 8 consists of, in order from the object side, a first lens group G1, a second lens group G2, a third lens group G3, a fourth lens group G4, an aperture stop St, and a fifth lens group G5. The first lens group G1 consists of, in order from the object side, a first lens group front group G1a consisting of three lenses, a first lens group intermediate group G1b consisting of two lenses, and a first lens group rear group G1c consisting of three lenses. The present example is the same as Example 5 in terms of the signs of refractive powers of the lens groups, the lens groups moving during zooming, and the lens groups moving during focusing.

Figure 18:
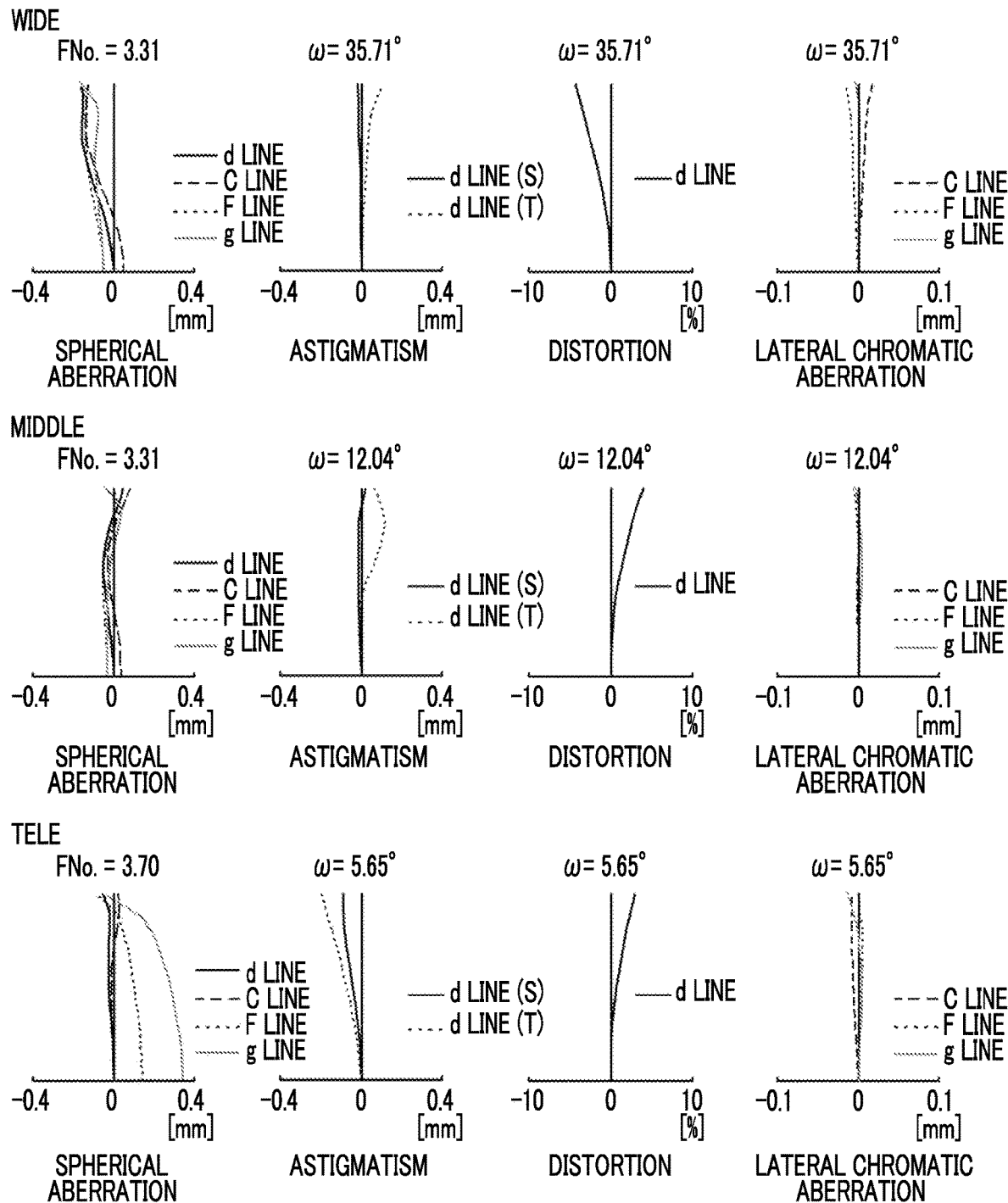
FIG. 18 is a diagram of aberrations of the zoom lens according to Example 8 of the present invention, where the upper part thereof shows the zoom lens in the wide-angle end state, the middle part thereof shows the zoom lens in the middle focal length state, the lower part thereof shows the zoom lens in the telephoto end state, and aberration diagrams of each state are spherical aberration diagram, astigmatism diagram, distortion diagram, and lateral chromatic aberration diagram in order from the left side.

Table 20 shows basic lens data of the zoom lens of Example 8, Table 21 shows values of specification and variable surface distances, and FIG. 18 shows aberration diagrams in a state where the infinite object is in focus.

TABLE 20

Example 8

| Si | Ri | Di | Ndj | vdj | θgFj |
|---|---|---|---|---|---|
| 1 | 133.05470 | 3.50000 | 1.910823 | 35.25 | 0.5822 |
| 2 | 54.12002 | 18.73392 | | | |
| 3 | −391.71033 | 3.00000 | 1.695602 | 59.05 | 0.5435 |
| 4 | 153.38326 | 0.29128 | | | |
| 5 | 80.45949 | 5.82006 | 1.802910 | 24.97 | 0.6129 |

TABLE 20-continued

Example 8

| Si | Ri | Di | Ndj | vdj | θgFj |
|---|---|---|---|---|---|
| 6 | 157.07544 | 5.93122 | | | |
| 7 | 781.06706 | 3.00000 | 1.805176 | 25.27 | 0.6122 |
| 8 | 205.52642 | 9.59605 | 1.496999 | 81.54 | 0.5375 |
| 9 | −139.61239 | 15.57700 | | | |
| 10 | 97.82514 | 3.02000 | 1.655474 | 40.17 | 0.5775 |
| 11 | 55.00410 | 16.96130 | 1.438750 | 94.66 | 0.5340 |
| 12 | −136.52050 | 0.12063 | | | |
| 13 | 99.75784 | 6.50803 | 1.695602 | 59.05 | 0.5435 |
| 14 | −997.71281 | DD[14] | | | |
| 15 | 98.68615 | 1.40000 | 1.910823 | 35.25 | 0.5822 |
| 16 | 33.12062 | 6.69152 | | | |
| 17 | −45.09180 | 1.20000 | 1.695602 | 59.05 | 0.5435 |
| 18 | 71.45685 | DD[18] | | | |
| 19 | 85.92877 | 5.41436 | 1.698947 | 31.81 | 0.5944 |
| 20 | −50.18700 | 1.21000 | 1.695596 | 56.48 | 0.5432 |
| 21 | −96.41737 | DD[21] | | | |
| 22 | −49.76607 | 1.21000 | 1.695602 | 59.05 | 0.5435 |
| 23 | 48.33792 | 2.79257 | 1.841398 | 24.30 | 0.6159 |
| 24 | 1002.30801 | DD[24] | | | |
| 25(St) | ∞ | 1.46954 | | | |
| 26 | 84.10615 | 3.51561 | 1.988478 | 29.15 | 0.6007 |
| 27 | −120.57733 | 0.12000 | | | |
| 28 | 35.87832 | 7.56071 | 1.496999 | 81.54 | 0.5375 |
| 29 | −38.14005 | 1.60026 | 1.951290 | 21.53 | 0.6283 |
| 30 | 95.79248 | 11.73060 | | | |
| 31 | 106.88349 | 4.42792 | 1.882244 | 21.92 | 0.6244 |
| 32 | −55.66685 | 1.95385 | | | |
| 33 | 29.67418 | 10.18976 | 1.618000 | 63.33 | 0.5441 |
| 34 | −55.23671 | 1.71475 | 1.953748 | 32.32 | 0.5901 |
| 35 | 19.18428 | 2.24658 | | | |
| 36 | 22.73247 | 6.92488 | 1.496999 | 81.54 | 0.5375 |
| 37 | −21.61774 | 3.61671 | 1.900433 | 37.37 | 0.5772 |
| 38 | 42.23979 | 11.86015 | | | |
| 39 | 54.60539 | 5.89772 | 1.595220 | 67.73 | 0.5443 |
| 40 | −53.31542 | 0.00000 | | | |
| 41 | ∞ | 2.30000 | 1.516330 | 64.14 | 0.5353 |
| 42 | ∞ | 32.06000 | | | |

TABLE 21

Example 8

| | WIDE | MIDDLE | TELE |
|---|---|---|---|
| Zr | 1.00 | 3.10 | 6.76 |
| f | 20.72 | 64.24 | 139.97 |
| Bf | 33.57 | 33.57 | 33.57 |
| FNo. | 3.31 | 3.31 | 3.70 |
| 2ω(°) | 71.42 | 24.08 | 11.30 |
| DD[14] | 1.00 | 48.04 | 66.40 |
| DD[18] | 3.20 | 5.00 | 2.22 |
| DD[21] | 53.14 | 6.25 | 5.36 |
| DD[24] | 18.10 | 16.15 | 1.47 |

Example 9

Figure 10:
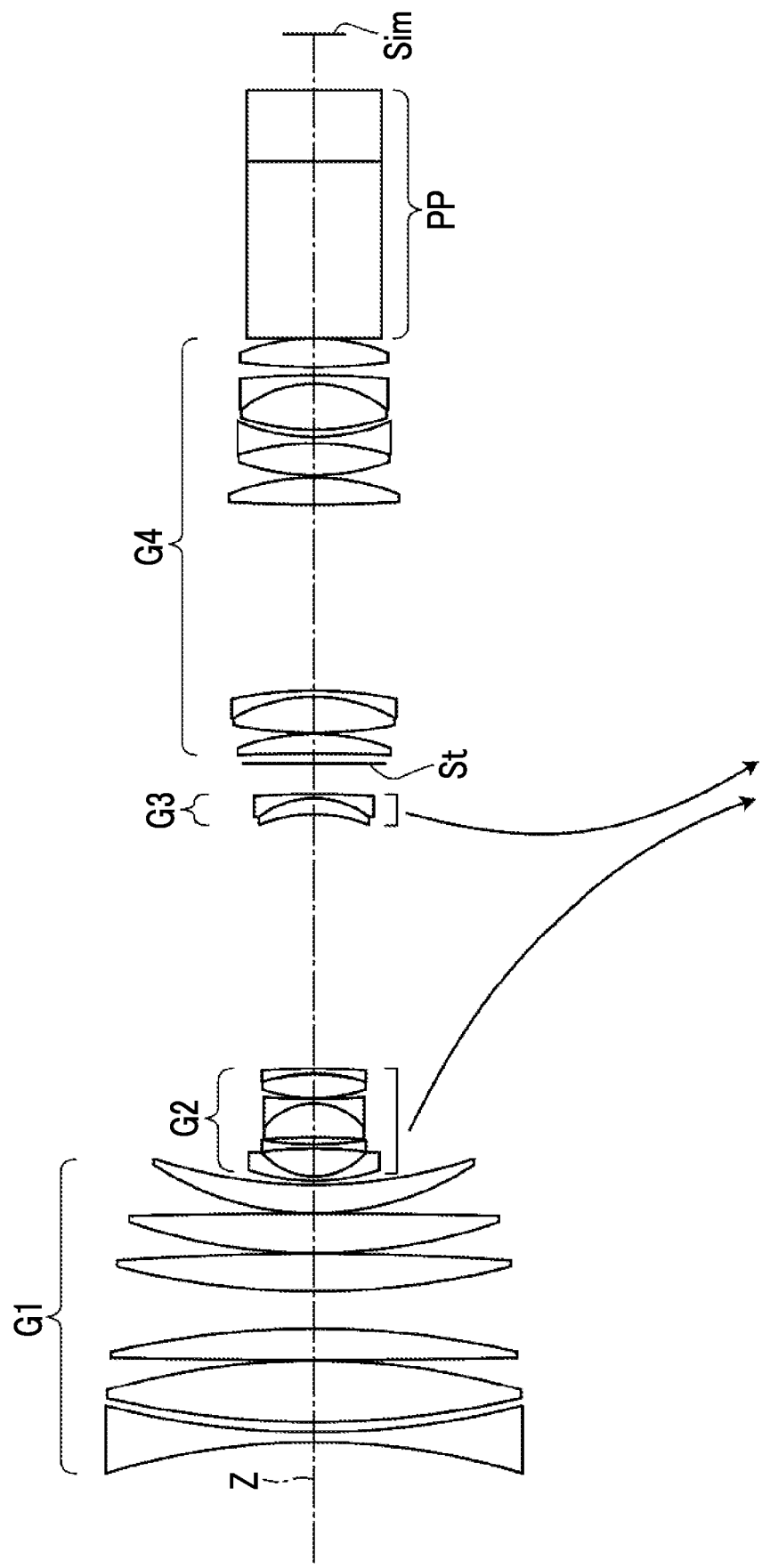
FIG. 10 is a cross-sectional view illustrating a configuration of a zoom lens of Example 9 of the present invention.

FIG. 10 is a cross-sectional view of a zoom lens of Example 9. The zoom lens of Example 9 consists of, in order from the object side, a first lens group G1, a second lens group G2, a third lens group G3, an aperture stop St, and a fourth lens group G4. The first lens group G1 consists of one negative lens and five negative lenses in order from the object side. During focusing, the first to third lenses from the object side of the first lens group G1 remain stationary with respect to the image plane Sim, and the fourth to sixth lenses from the object side of the first lens group G1 move in the direction of the optical axis. The sign of the refractive power of each lens group and the lens group moving during zooming are the same as those in Example 1.

Table 22 shows basic lens data of the zoom lens of Example 9, Table 23 shows values of specification and variable surface distances, and FIG. 19 shows aberration diagrams in a state where the infinite object is in focus.

TABLE 22

Example 9

| Si | Ri | Di | Ndj | vdj | θgFj |
|---|---|---|---|---|---|
| 1 | −126.95737 | 1.85000 | 1.806100 | 33.27 | 0.5885 |
| 2 | 149.63908 | 1.86353 | | | |
| 3 | 162.56196 | 11.59799 | 1.433871 | 95.18 | 0.5373 |
| 4 | −131.43557 | 0.12017 | | | |
| 5 | 1767.38973 | 5.79391 | 1.433871 | 95.18 | 0.5373 |
| 6 | −161.57632 | 6.93731 | | | |
| 7 | 143.25520 | 6.97980 | 1.433871 | 95.18 | 0.5373 |
| 8 | −501.53280 | 0.12020 | | | |
| 9 | 102.71367 | 7.30164 | 1.632460 | 63.77 | 0.5421 |
| 10 | −1279.18292 | 0.12015 | | | |
| 11 | 52.36368 | 5.22130 | 1.695602 | 59.05 | 0.5435 |
| 12 | 90.12596 | DD[12] | | | |
| 13 | 37.28114 | 0.80009 | 2.001003 | 29.13 | 0.5995 |
| 14 | 12.29686 | 5.14881 | | | |
| 15 | −79.05024 | 0.81066 | 1.695602 | 59.05 | 0.5435 |
| 16 | 55.48025 | 1.25321 | | | |
| 17 | −118.87335 | 6.29787 | 1.808095 | 22.76 | 0.6307 |
| 18 | −11.60294 | 0.89994 | 1.860322 | 41.97 | 0.5638 |
| 19 | 139.16815 | 0.12024 | | | |
| 20 | 29.45305 | 4.40793 | 1.557208 | 50.70 | 0.5593 |
| 21 | −32.29232 | 0.13997 | | | |
| 22 | −29.68924 | 0.91777 | 1.695602 | 59.05 | 0.5435 |
| 23 | −137.49811 | DD[23] | | | |
| 24 | −26.11338 | 2.94239 | 1.731334 | 29.25 | 0.6006 |
| 25 | −16.28232 | 0.80762 | 1.695602 | 59.05 | 0.5435 |
| 26 | −130.41228 | DD[26] | | | |
| 27(St) | ∞ | 1.85032 | | | |
| 28 | −375.35251 | 3.66853 | 1.703851 | 42.12 | 0.5727 |
| 29 | −38.57852 | 0.17412 | | | |
| 30 | 74.45483 | 6.67860 | 1.516330 | 64.14 | 0.5353 |
| 31 | −29.71279 | 1.20210 | 1.882997 | 40.76 | 0.5668 |
| 32 | −69.95930 | 34.66041 | | | |
| 33 | 234.07781 | 4.99625 | 1.517417 | 52.43 | 0.5565 |
| 34 | −40.81314 | 0.50000 | | | |
| 35 | 40.64186 | 5.85957 | 1.487490 | 70.24 | 0.5301 |
| 36 | −46.57752 | 1.20022 | 1.806100 | 33.27 | 0.5885 |
| 37 | 34.79196 | 1.36577 | | | |
| 38 | 41.96142 | 8.49290 | 1.496999 | 81.54 | 0.5375 |
| 39 | −20.65900 | 1.57625 | 1.882997 | 40.76 | 0.5668 |
| 40 | −136.64621 | 1.50826 | | | |
| 41 | 99.48573 | 5.34307 | 1.595509 | 39.24 | 0.5804 |
| 42 | −34.92679 | 0.00000 | | | |
| 43 | ∞ | 33.00000 | 1.608589 | 46.44 | 0.5666 |
| 44 | ∞ | 13.20000 | 1.516329 | 64.05 | 0.5346 |
| 45 | ∞ | 10.40601 | | | |

TABLE 23

Example 9

| | WIDE | MIDDLE | TELE |
|---|---|---|---|
| Zr | 1.00 | 8.00 | 17.30 |
| f | 7.98 | 63.86 | 138.11 |
| Bf | 39.63 | 39.63 | 39.63 |
| FNo. | 1.86 | 1.86 | 2.46 |
| 2ω(°) | 73.62 | 9.68 | 4.52 |
| DD[12] | 0.76 | 39.97 | 45.07 |
| DD[23] | 47.38 | 3.44 | 7.40 |
| DD[26] | 5.62 | 10.35 | 1.29 |

Table 24 shows values corresponding to Conditional Expressions (1) to (7) of the zoom lenses of Examples 1 to 9. The values shown in Table 24 are values at the d line.

TABLE 24

|  | Example 1 | Example 2 | Example 3 | Example 4 | Example 5 | Example 6 | Example 7 | Example 8 | Example 9 |
|---|---|---|---|---|---|---|---|---|---|
| (1) NF2 + 0.012 × vF2 | 2.398 | 2.416 | 2.398 | 2.416 | 2.404 | 2.404 | 2.398 | 2.404 | 2.404 |
| (2) vF2 − vF2 | −23.39 | −28.25 | −32.76 | −28.25 | −16.33 | −18.29 | −23.39 | −23.80 | −29.92 |
| (3) NF1 − NF2 | 0.222 | 0.261 | 0.270 | 0.261 | 0.139 | 0.187 | 0.222 | 0.215 | 0.305 |
| (4) fF2/fGNF | 0.95 | 0.96 | 0.95 | 0.95 | 1.05 | 0.95 | 1.73 | 1.84 | 3.63 |
| (5) NRn + 0.012 × vRn | 2.398 | 2.398 | 2.398 | 2.398 | 2.398 | 2.398 | 2.398 | 2.404 | 2.404 |
| (6) vRn − vRp | 28.07 | 28.07 | 28.07 | 28.07 | 28.07 | 28.07 | 28.07 | 34.75 | 29.80 |
| (7) fRn/fGNR | 0.41 | 0.40 | 0.47 | 0.44 | 0.41 | 0.40 | 0.38 | 0.41 | 0.54 |

As can be seen from the above data, each zoom lens of Examples 1 to 9 can be configured to have a small size since the number of lenses of the first lens group G1 is restricted to 6 to 8, which is relatively small. Therefore, the zoom ratio is in a range of 5.79 to 17.3 such that the high zoom ratio is ensured, and various aberrations including chromatic aberration are satisfactorily corrected, whereby high optical performance is realized.

Figure 20:
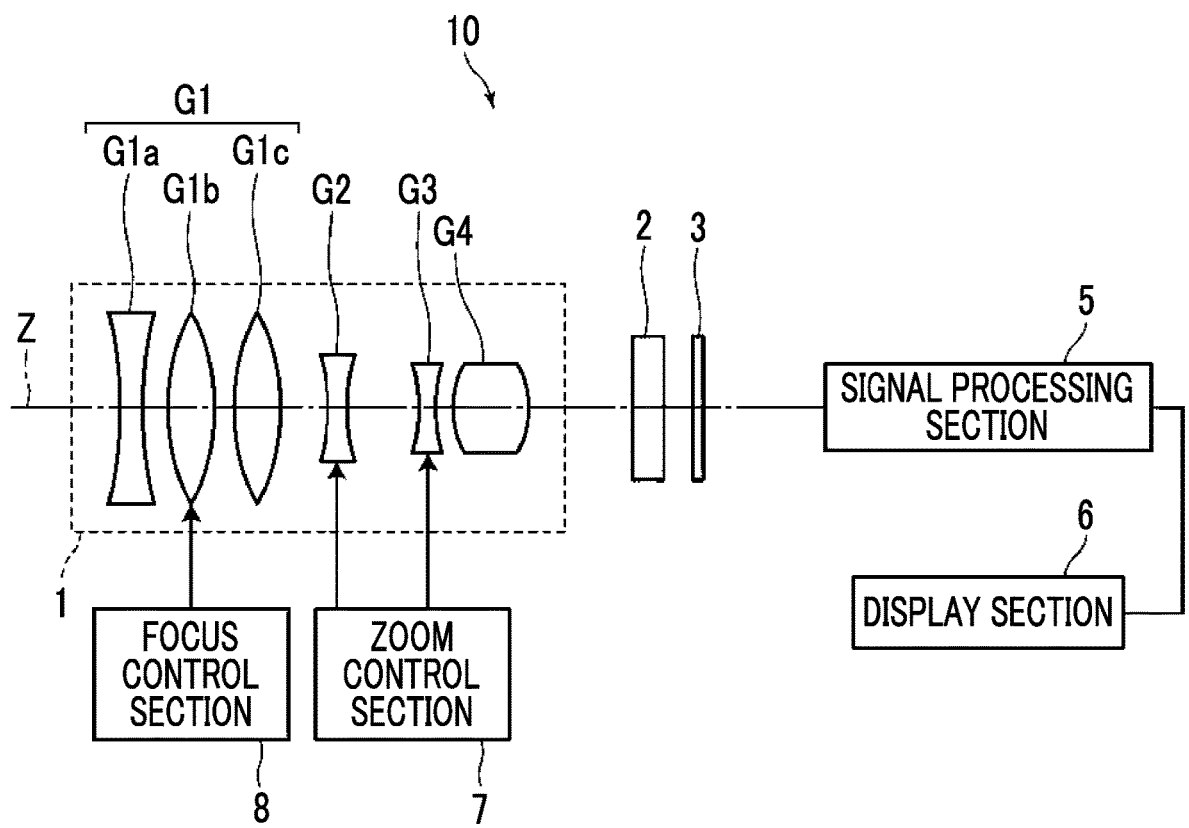
FIG. 20 is a schematic configuration diagram of an imaging apparatus according to an embodiment of the present invention.

Next, an imaging apparatus according to an embodiment of the present invention will be described. FIG. 20 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 20 schematically shows the first lens group front group G1a, the first lens group intermediate group G1b, the first lens group rear group G1c, and the second to fourth lens groups G2 to G4 included in the zoom lens 1. The imaging element 3 captures an optical image, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 20 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric coefficient of each lens are not limited to the values shown in the numerical examples, and different values may be used therefor.

EXPLANATION OF REFERENCES

1: zoom lens
2: filter
3: imaging element
5: signal processing section
6: display section
7: zoom control section
8: focus control section
10: imaging apparatus
G1: first lens group
G1a: first lens group front group
G1b: first lens group intermediate group
G1c: first lens group rear group
G2: second lens group
G3: third lens group
G4: fourth lens group
G5: fifth lens group
Ge: final lens group
GNF: front side negative lens group
GNR: rear side negative lens group
L11 to L18, L21 to L24, L31 to L32, L41 to L49: lens
PP: optical member
Sim: image plane
St: aperture stop
ma, ta, wa: on-axis rays
mb, tb, wb: rays with maximum angle of view
Z: optical axis

What is claimed is:

1. A zoom lens comprising, in order from an object side:
a first lens group that has a positive refractive power and remains stationary with respect to an image plane during zooming;
a plurality of movable lens groups that move by changing distances between groups adjacent to each other in a direction of an optical axis during zooming; and
a final lens group that has a positive refractive power and remains stationary with respect to the image plane during zooming,
wherein in the plurality of movable lens groups, at least two movable lens group all have a negative refractive power,
wherein in a case where the movable lens group which is closest to the object side and has a negative refractive power is set as a front side negative lens group, the front side negative lens group has two or more negative lenses,
wherein in a case where the movable lens group which is closest to an image side and has a negative refractive power is set as a rear side negative lens group, the rear side negative lens group includes a negative lens and a positive lens, and
wherein all Conditional Expressions (1) to (3), (5) and (6) are satisfied, $$2.395 < NF2 + 0.012 \times vF2 < 2.495 \qquad (1),$$

$$-35 < vF1 - vF2 < -16 \qquad (2),$$

and $$0.12 < NF1 - NF2 < 0.34 \quad (3),$$

$$2.395 < NRn + 0.012 \times vRn < 2.495 \quad (5),$$

and $$25 < vRn - vRp < 35 \quad (6),$$

where NF2 is a refractive index of a second negative lens from the object side in the front side negative lens group at the d line, vF2 is an Abbe number of the second negative lens from the object side in the front side negative lens group at the d line, vF1 is an Abbe number of a negative lens closest to the object side in the front side negative lens group at the d line, NF1 is a refractive index of the negative lens closest to the object side in the front side negative lens group at the d line, NRn is a refractive index of the negative lens of the rear side negative lens group at the d line, vRn is an Abbe number of the negative lens of the rear side negative lens group at the d line, and vRp is an Abbe number of the positive lens of the rear side negative lens group at the d line.

2. The zoom lens according to claim 1, wherein Conditional Expression (4) is satisfied, $$0.93 < fF2/fGNF < 1.1 \quad (4),$$

where fF2 is a focal length of the second negative lens from the object side in the front side negative lens group, and fGNF is a focal length of the front side negative lens group.

3. The zoom lens according to claim 1, wherein Conditional Expression (7) is satisfied, $$0.35 < fRn/fGNR < 0.51 \quad (7),$$

where fRn is a focal length of the negative lens of the rear side negative lens group, and fGNR is a focal length of the rear side negative lens group.

4. The zoom lens according to claim 2, wherein Conditional Expression (7) is satisfied, $$0.35 < fRn/fGNR < 0.51 \quad (7),$$

where fRn is a focal length of the negative lens of the rear side negative lens group, and fGNR is a focal length of the rear side negative lens group.

5. The zoom lens according to claim 1, wherein Conditional Expression (1-1) is satisfied, $$2.395 < NF2 + 0.012 \times vF2 < 2.455 \quad (1-1).$$

6. The zoom lens according to claim 2, wherein Conditional Expression (1-1) is satisfied, $$2.395 < NF2 + 0.012 \times vF2 < 2.455 \quad (1-1).$$

7. The zoom lens according to claim 3, wherein Conditional Expression (1-1) is satisfied, $$2.395 < NF2 + 0.012 \times vF2 < 2.455 \quad (1-1).$$

8. The zoom lens according to claim 4, wherein Conditional Expression (1-1) is satisfied, $$2.395 < NF2 + 0.012 \times vF2 < 2.455 \quad (1-1).$$

9. The zoom lens according to claim 1, wherein Conditional Expression (2-1) is satisfied, $$-33 < vF1 - vF2 < -18 \quad (2-1).$$

10. The zoom lens according to claim 2, wherein Conditional Expression (2-1) is satisfied, $$-33 < vF1 - vF2 < -18 \quad (2-1).$$

11. The zoom lens according to claim 3, wherein Conditional Expression (2-1) is satisfied, $$-33 < vF1 - vF2 < -18 \quad (2-1).$$

12. The zoom lens according to claim 1, wherein Conditional Expression (3-1) is satisfied, $$0.13 < NF1 - NF2 < 0.31 \quad (3-1).$$

13. The zoom lens according to claim 1, wherein Conditional Expression (4-1) is satisfied, $$0.94 < fF2/fGNF < 1.05 \quad (4-1),$$

where fF2 is a focal length of the second negative lens from the object side in the front side negative lens group, and fGNF is a focal length of the front side negative lens group.

14. The zoom lens according to claim 1, wherein Conditional Expression (5-1) is satisfied, $$2.395 < NRn + 0.012 \times vRn2 < 2.455 \quad (5-1).$$

15. The zoom lens according to claim 1, wherein Conditional Expression (6-1) is satisfied $$27 < vRn - vRp < 30 \quad (6-1).$$

16. The zoom lens according to claim 1, wherein Conditional Expression (7-1) is satisfied, $$0.37 < fRn/fGNR < 0.48 \quad (7-1),$$

where fRn is a focal length of the negative lens of the rear side negative lens group, and fGNR is a focal length of the rear side negative lens group.

17. The zoom lens according to claim 1, wherein the plurality of movable lens groups includes a lens group having a negative refractive power and a lens group having a negative refractive power.

18. The zoom lens according to claim 1, wherein the plurality of movable lens groups includes, in order from the object side, a lens group having a positive refractive power, a lens group having a negative refractive power, and a lens group having a negative refractive power.

19. The zoom lens according to claim 1, wherein the plurality of movable lens groups includes, in order from the object side, a lens group having a negative refractive power, a lens group having a positive refractive power, and a lens group having a negative refractive power.

20. An imaging apparatus comprising the zoom lens according to claim 1.

* * * * *